(12) United States Patent
Sequeda et al.

(10) Patent No.: US 11,657,089 B2
(45) Date of Patent: *May 23, 2023

(54) METHOD AND SYSTEM FOR EDITING AND MAINTAINING A GRAPH SCHEMA

(71) Applicants: Juan Federico Sequeda, Austin, TX (US); Wayne Phillip Heideman, Austin, TX (US); Daniel Paul Miranker, Austin, TX (US)

(72) Inventors: Juan Federico Sequeda, Austin, TX (US); Wayne Phillip Heideman, Austin, TX (US); Daniel Paul Miranker, Austin, TX (US)

(73) Assignee: data.world, Inc., Austin, TX (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/558,076

(22) Filed: Aug. 31, 2019

(65) Prior Publication Data

US 2020/0097504 A1 Mar. 26, 2020

Related U.S. Application Data

(63) Continuation of application No. 16/435,196, filed on Jun. 7, 2019, now Pat. No. 11,442,988.
(Continued)

(51) Int. Cl.
*G06F 16/901* (2019.01)
*G06F 16/242* (2019.01)
(Continued)

(52) U.S. Cl.
CPC ........ *G06F 16/9024* (2019.01); *G06F 16/212* (2019.01); *G06F 16/213* (2019.01); *G06F 16/2438* (2019.01); *G06F 16/367* (2019.01)

(58) Field of Classification Search
CPC ..... G06F 16/211; G06F 16/212; G06F 16/213
See application file for complete search history.

(56) References Cited

U.S. PATENT DOCUMENTS 6,144,962 A 11/2000 Weinberg et al.
6,317,752 B1 11/2001 Lee et al.
(Continued)

FOREIGN PATENT DOCUMENTS

CA 2820994 A1 1/2014
CN 103425734 B 6/2017
(Continued)

OTHER PUBLICATIONS

Stanford University, Protégé Wiki, accessed Feb. 1, 2022 at https://protegewiki.stanford.edu/index.php?title=WebProtegeUsersGuide&oldid=13283&printable=yes (Year: 2015).*
(Continued)

*Primary Examiner* — William Spieler
(74) *Attorney, Agent, or Firm* — Kokka & Backus, PC

(57) ABSTRACT

A system and method for creating and editing graph schema data structures in a collaborative, real time graphical editing environment is disclosed. The system and method further operates to integrate external sources of data as components of the graph schema. The system and method outputs definition files for the graph schema data structure and mapping files that enable the population of a graph database.

20 Claims, 24 Drawing Sheets

Related U.S. Application Data

(60) Provisional application No. 62/681,912, filed on Jun. 7, 2018.

(51) Int. Cl.
  *G06F 16/36* (2019.01)
  *G06F 16/21* (2019.01)

(56) References Cited

U.S. PATENT DOCUMENTS

| | | |
|---|---|---|
| 6,529,909 B1 | 3/2003 | Bowman-Amuah |
| 6,768,986 B2 | 7/2004 | Cras et al. |
| 6,961,728 B2 | 11/2005 | Wynblatt et al. |
| 7,080,090 B2 | 7/2006 | Shah et al. |
| 7,146,375 B2 | 12/2006 | Egilsson et al. |
| 7,680,862 B2 | 3/2010 | Chong et al. |
| 7,702,639 B2 | 4/2010 | Stanley et al. |
| 7,761,407 B1 | 7/2010 | Stern |
| 7,836,063 B2 | 11/2010 | Salazar et al. |
| 7,853,081 B2 | 12/2010 | Thint |
| 7,856,416 B2 | 12/2010 | Hoffman et al. |
| 7,877,350 B2 | 1/2011 | Stanfill et al. |
| 7,953,695 B2 | 5/2011 | Roller et al. |
| 7,987,179 B2 | 7/2011 | Ma et al. |
| 8,037,108 B1 | 10/2011 | Chang |
| 8,060,472 B2 | 11/2011 | Itai et al. |
| 8,099,382 B2 | 1/2012 | Liu et al. |
| 8,170,981 B1 | 5/2012 | Tewksbary |
| 8,275,784 B2 | 9/2012 | Cao et al. |
| 8,296,200 B2 | 10/2012 | Mangipudi et al. |
| 8,312,389 B2 | 11/2012 | Crawford et al. |
| 8,429,179 B1 | 4/2013 | Mirhaji |
| 8,521,565 B2 | 8/2013 | Faulkner et al. |
| 8,538,985 B2 | 9/2013 | Betawadkar-Norwood et al. |
| 8,583,631 B1 | 11/2013 | Ganapathi et al. |
| 8,616,443 B2 | 12/2013 | Butt et al. |
| 8,640,056 B2 | 1/2014 | Helfman et al. |
| 8,719,252 B2 | 5/2014 | Miranker et al. |
| 8,762,160 B2 | 6/2014 | Lulla |
| 8,799,240 B2 | 8/2014 | Stowe et al. |
| 8,831,070 B2 | 9/2014 | Huang et al. |
| 8,843,502 B2 | 9/2014 | Elson et al. |
| 8,856,643 B2 | 10/2014 | Drieschner |
| 8,892,513 B2 | 11/2014 | Forsythe |
| 8,935,272 B2 | 1/2015 | Ganti et al. |
| 8,943,313 B2 | 1/2015 | Glew et al. |
| 8,965,915 B2 | 2/2015 | Ganti et al. |
| 8,990,236 B2 | 3/2015 | Mizrahy et al. |
| 8,996,559 B2 | 3/2015 | Ganti et al. |
| 8,996,978 B2 | 3/2015 | Richstein et al. |
| 9,002,860 B1 | 4/2015 | Ghemawat |
| 9,171,077 B2 | 10/2015 | Balmin et al. |
| 9,218,365 B2 | 12/2015 | Irani et al. |
| 9,244,952 B2 | 1/2016 | Ganti et al. |
| 9,268,950 B2 | 2/2016 | Gkoulalas-Divanis et al. |
| 9,396,283 B2 | 7/2016 | Miranker et al. |
| 9,495,429 B2 | 11/2016 | Miranker |
| 9,560,026 B1 | 1/2017 | Worsley |
| 9,607,042 B2 | 3/2017 | Long |
| 9,613,152 B2 | 4/2017 | Kucera |
| 9,659,081 B1 | 5/2017 | Ghodsi et al. |
| 9,690,792 B2 | 6/2017 | Bartlett et al. |
| 9,696,981 B2 | 7/2017 | Martin et al. |
| 9,710,526 B2 | 7/2017 | Couris et al. |
| 9,710,568 B2 | 7/2017 | Srinivasan et al. |
| 9,720,958 B2 | 8/2017 | Bagehorn et al. |
| 9,760,602 B1 | 9/2017 | Ghodsi et al. |
| 9,769,032 B1 | 9/2017 | Ghodsi et al. |
| 9,798,737 B2 | 10/2017 | Palmer |
| 9,836,302 B1 | 12/2017 | Hunter et al. |
| 9,959,337 B2 | 5/2018 | Ghodsi et al. |
| 9,990,230 B1 | 6/2018 | Stoica et al. |
| 10,095,735 B2 | 10/2018 | Ghodsi et al. |
| 10,102,258 B2 | 10/2018 | Jacob et al. |
| 10,176,234 B2 | 1/2019 | Gould et al. |
| 10,216,860 B2 | 2/2019 | Miranker et al. |
| 10,248,297 B2 | 4/2019 | Beechuk et al. |
| 10,296,329 B2 | 5/2019 | Hunter et al. |
| 10,324,925 B2 | 6/2019 | Jacob et al. |
| 10,346,429 B2 | 7/2019 | Jacob et al. |
| 10,353,911 B2 | 7/2019 | Reynolds et al. |
| 10,361,928 B2 | 7/2019 | Ghodsi et al. |
| 10,438,013 B2 | 10/2019 | Jacob et al. |
| 10,452,677 B2 | 10/2019 | Jacob et al. |
| 10,452,975 B2 | 10/2019 | Jacob et al. |
| 10,474,501 B2 | 11/2019 | Ghodsi et al. |
| 10,474,736 B1 | 11/2019 | Stoica et al. |
| 10,545,986 B2 | 1/2020 | Tappan et al. |
| 10,546,001 B1 | 1/2020 | Nguyen et al. |
| D876,454 S | 2/2020 | Knowles et al. |
| 10,558,664 B2 | 2/2020 | Armbrust et al. |
| D877,167 S | 3/2020 | Knowles et al. |
| D879,112 S | 3/2020 | Hejazi et al. |
| 10,606,675 B1 | 3/2020 | Luszczak et al. |
| 10,645,548 B2 | 5/2020 | Reynolds et al. |
| 10,664,509 B1 | 5/2020 | Reeves et al. |
| 10,673,887 B2 | 6/2020 | Crabtree et al. |
| 10,678,536 B2 | 6/2020 | Hunter et al. |
| 10,691,299 B2 | 6/2020 | Broek et al. |
| 10,691,433 B2 | 6/2020 | Shankar et al. |
| 10,769,130 B1 | 9/2020 | Armbrust et al. |
| 10,769,535 B2 | 9/2020 | Lindsley |
| 10,810,051 B1 | 10/2020 | Shankar et al. |
| 10,984,008 B2 | 4/2021 | Jacob et al. |
| 11,068,453 B2 | 7/2021 | Griffith |
| 11,068,475 B2 | 7/2021 | Boutros et al. |
| 11,068,847 B2 | 7/2021 | Boutros et al. |
| 2002/0133476 A1 | 9/2002 | Reinhardt |
| 2002/0143755 A1 | 10/2002 | Wynblatt et al. |
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |
| 2006/0100995 A1 | 5/2006 | Albornoz et al. |
| 2006/0117057 A1 | 6/2006 | Legault et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0055662 A1 | 3/2007 | Edelman et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 | 6/2008 | Werner et al. |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0094416 A1 | 4/2009 | Baeza-Yates et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |

(56) References Cited

U.S. PATENT DOCUMENTS

| | | |
|---|---|---|
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0300054 A1 | 12/2009 | Fisher et al. |
| 2010/0114885 A1 | 5/2010 | Bowers et al. |
| 2010/0138388 A1 | 6/2010 | Wakeling et al. |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0098418 A1 | 4/2016 | Dakshinamurthy et al. |
| 2016/0100009 A1 | 4/2016 | Zoldi et al. |
| 2016/0117358 A1 | 4/2016 | Schmid et al. |
| 2016/0117362 A1 | 4/2016 | Bagehorn et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0032259 A1* | 2/2017 | Goranson ............... G06F 40/30 |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |

(56) References Cited

U.S. PATENT DOCUMENTS

| | | |
|---|---|---|
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0173848 A1 | 6/2021 | Jacob et al. |
| 2021/0224250 A1 | 7/2021 | Griffith |
| 2021/0224330 A1 | 7/2021 | Miranker et al. |

FOREIGN PATENT DOCUMENTS

| | | |
|---|---|---|
| EP | 2631817 A1 | 8/2013 |
| EP | 2631819 A1 | 8/2013 |
| EP | 2685394 A3 | 6/2017 |
| GB | 2519779 A | 5/2015 |
| JP | 2013175181 A | 9/2013 |
| JP | 2013246828 A | 12/2013 |
| WO | 2012054860 A1 | 4/2012 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |

OTHER PUBLICATIONS

Noy, Natalya F., et al. "Tracking changes during ontology evolution." International Semantic Web Conference. Springer, Berlin, Heidelberg, 2004. (Year: 2004).*

Tudorache, Tania, et al. "Supporting collaborative ontology development in Protégé." International Semantic Web Conference. Springer, Berlin, Heidelberg, 2008. (Year: 2008).*

Lembo, Domenico, et al. "Eddy: A Graphical Editor for OWL 2 Ontologies." IJCAI. 2016. (Year: 2016).*

Lembo, Domenico, et al. "Easy OWL drawing with the graphol visual ontology language." Fifteenth International Conference on the Principles of Knowledge Representation and Reasoning. 2016. (Year: 2016).*

Nemirovski, German, and Andreas Nolle. "Map-On: A web-based editor for visual ontology mapping." Semantic Web 8.6 (2017): 969-980. (Year: 2017).*

Barbançon, F., & Miranker, D. P. (2007). SPHINX: Schema integration by example. Journal of Intelligent Information Systems, 29(2), 145-184. (Year: 2007).*

Doan, A., Domingos, P., & Halevy, A. Y. (May 2001). Reconciling schemas of disparate data sources: A machine-learning approach. In Proceedings of the 2001 ACM SIGMOD international conference on Management of data (pp. 509-520). (Year: 2001).*

Nemirovski, German, et al. "Data integration driven ontology design, case study smart city." Proceedings of the 3rd International Conference on Web Intelligence, Mining and Semantics. 2013. (Year: 2013).*

"Data.World Comes Out Of Stealth To Make Open Data Easier." Americaninno.com, AustinInno, Jul. 11, 2016, www.americaninno.com/austin/open-data-tech-brett-hurts-startup-data-world-launches/.

Dwivedi, Mahesh H., Non-Final Office Action dated Jan. 30, 2020 for U.S. Appl. No. 15/454,955.

Gillin, Paul, "Neo4j Connector Integrates Graph Data With Business Intelligence Tools," SiliconANGLE, Published Mar. 24, 2020, Retrieved from on Mar. 25, 2020.

Hu, Xiaoqin, Final Office Action dated Oct. 31, 2019 for U.S. Appl. No. 15/454,969.

Hu, Xiaoqin, Final Office Action dated Sep. 24, 2019 for U.S. Appl. No. 15/454,981.

Woo, Isaac M., Non-Final Office Action dated May 5, 2020 for U.S. Appl. No. 16/137,292.

Yen, Syling, Final Office Action dated Oct. 25, 2019 for U.S. Appl. No. 15/186,519.

Yotova, Polina, Supplementary European Search Report and Examiner Search Opinion for European Patent Application No. 17815970.3, dated Feb. 21, 2020.

Angles, R., Gutierrez. C., "The Expressive Power of SPARQL," Proceedings of the 7th International Semantic Web Conference (ISWC2008). 2008.

Arenas, M., et al., "A Direct Mapping of Relational Data to RDF," W3C Recommendation, Sep. 27, 2012, Retrieved from the Internet [retrieved Mar. 7, 2019].

Beckett, D., Berners-Lee, T., "Turtle—Terse RDF Triple Language," W3C Team Submission, Jan. 14, 2008, Retrieved from the Internet [retrieved Mar. 7, 2019].

Beckett, D., Broekstra, J., "SPARQL Query Results XML Format," W3C Recommendation, Jan. 15, 2008, Retrieved from the Internet [retrieved Mar. 7, 2019].

Beckett, Dave, "RDF/XML Syntax Specification (Revised)," W3C Recommendation, Feb. 10, 2004, Retrieved from the Internet [retrieved Mar. 7, 2019].

Berners-Lee, Tim, "Notation 3," 2006, Retrieved from the Internet [retrieved on Mar. 7, 2019].

Berners-Lee, Tim, "Linked Data," 2009, Retrieved from the Internet [retrieved on Mar. 7, 2019].

Boutros et al., "Computerized Tools to Develop and Manage Data-Driven Projects Collaboratively Via a Networked Computing Platform and Collaborative Datasets," U.S. Appl. No. 15/985,702, filed May 22, 2018.

Boutros et al., "Computerized Tools to Facilitate Data Project Development Via Data Access Layering Logic in a Networked Computing Platform Including Collaborative Datasets," U.S. Appl. No. 15/985,704, filed May 22, 2018.

Boutros et al., "Dynamic Composite Data Dictionary to Facilitate Data Operations Via Computerized Tools Configured To Access

(56) References Cited

OTHER PUBLICATIONS

Collaborative Datasets in a Networked Computing Platform," U.S. Appl. No. 15/985,705, filed May 22, 2018.
Boutros et al., "Graphical User Interface for a Display Screen or Portion Thereof," U.S. Appl. No. 29/648,465, filed May 22, 2018.
Boutros et al., "Graphical User Interface for a Display Screen or Portion Thereof," U.S. Appl. No. 29/648,466, filed May 22, 2018.
Boutros et al., "Graphical User Interface for a Display Screen or Portion Thereof," U.S. Appl. No. 29/648,467, filed May 22, 2018.
Brener et al., "Computerized Tools Configured to Determine Subsets of Graph Data Arrangements for Linking Relevant Data to Enrich Datasets Associated with a Data-Driven Collaborative Dataset Platform," U.S. Appl. No. 16/395,036, filed Apr. 25, 2019.
Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Bullock, Joshua, Final Office Action dated Oct. 30, 2018 for U.S. Appl. No. 15/186,517.
Bullock, Joshua, Non-Final Office Action dated Jul. 12, 2018 for U.S. Appl. No. 15/186,517.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Clark, K., Feigenbaum, L., Torres, E., "SPARQL Protocol for RDF," W3C Recommendation, Jan. 15, 2008, Retrieved from the Internet [retrieved Mar. 7, 2019].
Copenheaver, Blaine R., Notification of Transmittal of the International Search Report and the Written Opinion of the International Searching Authority, or the Declaration dated Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Auto-Completion of Queries with Data Object Names and Data Profiles."
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Griffith et al., "Aggregation of Ancillary Data Associated with Source Data in a System of Networked Collaborative Datasets," U.S. Appl. No. 15/927,006, filed Mar. 20, 2018.
Griffith et al., "Data Ingestion to Generate Layered Dataset Interrelations to Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Layered Data Generation and Data Remediation to Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith, David Lee, "Determining a Degree of Similarity of a Subset of Tabular Data Arrangements to Subsets of Graph Data Arrangements at Ingestion into a Data-Driven Collaborative Dataset Platform," U.S. Appl. No. 16/137,297, filed Sep. 20, 2018.
Griffith, David Lee, "Matching Subsets of Tabular Data Arrangements to Subsets of Graphical Data Arrangements at Ingestion into Data Driven Collaborative Datasets," U.S. Appl. No. 16/137,292, filed Sep. 20, 2018.
Griffith, David Lee, "Predictive Determination of Constraint Data for Application with Linked Data in Graph-Based Datasets Associated with a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Jul. 30, 2019 for U.S. Appl. No. 15/186,515.
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.

(56) References Cited

OTHER PUBLICATIONS

Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation Via Distributed Computer Networks," U.S. Appl. No. 16/120,057, filed Aug. 31, 2018.
Jacob et al., "Collaborative Dataset Consolidation Via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/292,120, filed Mar. 4, 2019.
Jacob et al., "Dataset Analysis and Dataset Attribute Inferencing to Form Collaborative Datasets," U.S. Appl. No. 16/271,263, filed Feb. 8, 2019.
Jacob et al., "Management of Collaborative Datasets Via Distributed Computer Networks," U.S. Appl. No. 16/271,687, filed Feb. 8, 2019.
Jacob et al., "Management of Collaborative Datasets Via Distributed Computer Networks," U.S. Appl. No. 16/292,135, filed Mar. 4, 2019.
Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
Raab, Christopher J., Non-Final Office Action dated Jun. 28, 2018 for U.S. Appl. No. 15/186,520.
Raab, Christopher J., Notice of Allowance and Fee(s) Due and Notice of Allowability for U.S. Appl. No. 15/186,520, dated Jan. 2, 2019.
RDB2RDF Working Group Charter, Sep. 2009, Retrieved from the Internet [retrieved Mar. 7, 2019].
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.

(56) References Cited

OTHER PUBLICATIONS

U.S. Appl. No. 16/251,408, filed Jan. 18, 2019.
Ultrawrap Mapper, U.S. Appl. No. 62/169,268, filed Jun. 1, 2015 (Expired).
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Yen, Syling, Final Office Action dated Apr. 10, 2019 for U.S. Appl. No. 15/186,519.
Yen, Syling, Non-Final Office Action dated Feb. 8, 2019 for U.S. Appl. No. 15/186,519.
Yen, Syling, Non-Final Office Action dated Sep. 12, 2019 for U.S. Appl. No. 15/186,519.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.
Young, Lee W., Invitation to Pay Additional Fees And, Where Applicable, Protest Fee, dated Jun. 14, 2018 for International Application No. PCT/US2018/020812.
Young, Lee W., Notification of Transmittal of the International Search Report and the Written Opinion of the International Searching Authority, or the Declaration dated May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, dated Mar. 22, 2012.
Nguyen, Kim T., Non-Final Office Action dated Jun. 14, 2018 for U.S. Appl. No. 15/186,514.
Nguyen, Kim T., Non-Final Office Action dated Mar. 20, 2019 for U.S. Appl. No. 15/454,923.
Nguyen, Kim T., Notice of Allowance and Fee(s) Due, dated May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Griffith et al., "Transmuting Data Associations Among Data Arrangements to Facilitate Data Operations in a System of Networked Collaborative Datasets," U.S. Appl. No. 15/943,629, filed Apr. 2, 2018.
Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1--1-5.pdf. Retrieved on Oct. 6, 2020.
Doung, Hien, Non-Final Office Action dated Dec. 9, 2020 for U.S. Appl. No. 16/899,544.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Hoang, Hau Hai, Notice of Allowance and Fee(s) Due dated Aug. 19, 2021 for U.S. Appl. No. 16/697,132.
Nguyen, Bao-Yen Thi, Restriction Requirement dated Jun. 29, 2021 for U.S. Appl. No. 29/648,466.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Jun. 7, 2021 for U.S. Appl. No. 16/457,766.
Nguyen, Kim T., Non-Final Office Action dated May 11, 2021 for U.S. Appl. No. 16/395,036.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Nguyen, Kim T., Notice of Allowance and Fee(s) Due dated Aug. 17, 2021 for U.S. Appl. No. 16/428,915.
Nguyen, Kim T., Notice of Allowance and Fee(s) Due dated Aug. 3, 2021 for U.S. Appl. No. 16/457,766.
Nguyen, Kim T., Notice of Allowance and Fee(s) Due dated Mar. 16, 2021 for U.S. Appl. No. 15/985,702.
Nguyen, Kim T., Notice of Allowance and Fee(s) Due dated Mar. 16, 2021 for U.S. Appl. No. 16/137,297.
Nguyen, Kim T., Notice of Allowance and Fee(s) Due dated Mar. 17, 2021 for U.S. Appl. No. 15/985,704.
Nguyen, Kim T., Notice of Allowance and Fee(s) Due dated Mar. 31, 2021 for U.S. Appl. No. 15/985,705.
Raab, Christopher J., Non-Final Office Action dated Jul. 24, 2020 for U.S. Appl. No. 16/271,687.
Raab, Christopher J., Non-Final Office Action dated Oct. 16, 2020 for U.S. Appl. No. 16/287,967.
Rachapalli et al., "RETRO: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
Spieler, William, Final Office Action dated Mar. 15, 2021 for U.S. Appl. No. 16/435,196.
Spieler, William, Non-Final Office Action dated Dec. 31, 2020 for U.S. Appl. No. 16/435,196.
Spieler, William, Non-Final Office Action dated Jul. 9, 2021 for U.S. Appl. No. 16/435,196.
Uddin, Md I, Non-Final Office Action dated May 13, 2021 for U.S. Appl. No. 16/404,113.
Uddin, Md I., Final Office Action dated Jan. 1, 2021 for U.S. Appl. No. 16/404,113.
Uddin, Md I., Non-Final Office Action dated Oct. 6, 2020 for U.S. Appl. No. 16/404,113.

* cited by examiner

My Databases

| DATABASE | IMPORTED | TYPE | DATE CREATED | ER&S USING | CONNECTION DETAILS |
|---|---|---|---|---|---|
| TestDB | No | oracle | May 17, 2019 | 1 | Host: careprecise.czbfv3yap0qm.us-west-2.rds.amazonaws.com Port: 1521 DB: CAREPREC User: JUANSTER |
| Order Management System | No | sqlserver | May 20, 2019 | 1 | Host: arbonne.czbfv3yap0qm.us-west-2.rds.amazonaws.com Port: 1433 DB: PDE User: juanmaster |
| MSSQLTestDB | No | sqlserver | May 20, 2019 | 0 | Host: arbonne.czbfv3yap0qm.us-west-2.rds.amazonaws.com Port: 1433 DB: arbonne User: juanmaster |

Fig. 15

METHOD AND SYSTEM FOR EDITING AND MAINTAINING A GRAPH SCHEMA

CROSS-REFERENCE TO RELATED APPLICATIONS

This application is a continuation of copending U.S. patent application Ser. No. 16/435,196, filed Jun. 7, 2019 and entitled, "METHOD AND SYSTEM FOR EDITING AND MAINTAINING A GRAPH SCHEMA," which claims the benefit of U.S. Provisional Patent Application No. 62/681,912 filed on Jun. 7, 2018, all which is hereby incorporated by reference in their entirety for all purposes. This specification incorporates by reference the appendices attached to the specification and filed herewith.

GOVERNMENT LICENSE RIGHTS

This invention was made with government support under Grant Nos. DBI-0851052 and 1018554 awarded by the National Science Foundation. The government has certain rights in the invention.

FIELD AND BACKGROUND OF INVENTION

Business users are not able to directly access business data using their own business terminology. When business users need data to generate Business Intelligence (BI) reports, they depend on IT. The IT dept will setup a data warehouse to host the different data sources that the business users need. IT will analyze the different databases and generate an enterprise database schema that will be able to store data coming from the different sources. This schema is generated using data modelling tools (Tool 1). Furthermore, the terminology used in the enterprise schema usually comes from IT and does not consider the terminology that business users use. For example table and attribute names are not agreed business terminology. Subsequently, business users use different tools to manage business terminology, taxonomies, etc. (Tool 2). The business user terminology created in Tool 2 is disconnected from the models that are created with Tool 1. Finally, once an enterprise database schema is created, IT uses data integration ETL tools to move data from source databases to the newly created target data warehouse (Tool 3). It is common that business users identify issues with the data and also want to include new data. Therefore the enterprise database schema is changed and disconnected from the model that was created in Tool 2 and does not use the business terminology created in Tool 1.

The invention is a system for business users and IT professionals alike to directly access data using their own terminologies in a collaborative way by:
Enabling business users to model the business knowledge (model);
Enabling both business users and IT professionals to make incremental changes to the model.
Mapping the business model to the physical databases (govern); and
Accessing the data without the need of creating a data warehouse (integrate).

BRIEF DESCRIPTION OF THE DRAWINGS

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

FIG. 15: depicts the user interface for selecting a database as a source of content for the graph schema.

DETAILED DESCRIPTION OF THE PREFERRED EMBODIMENTS

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
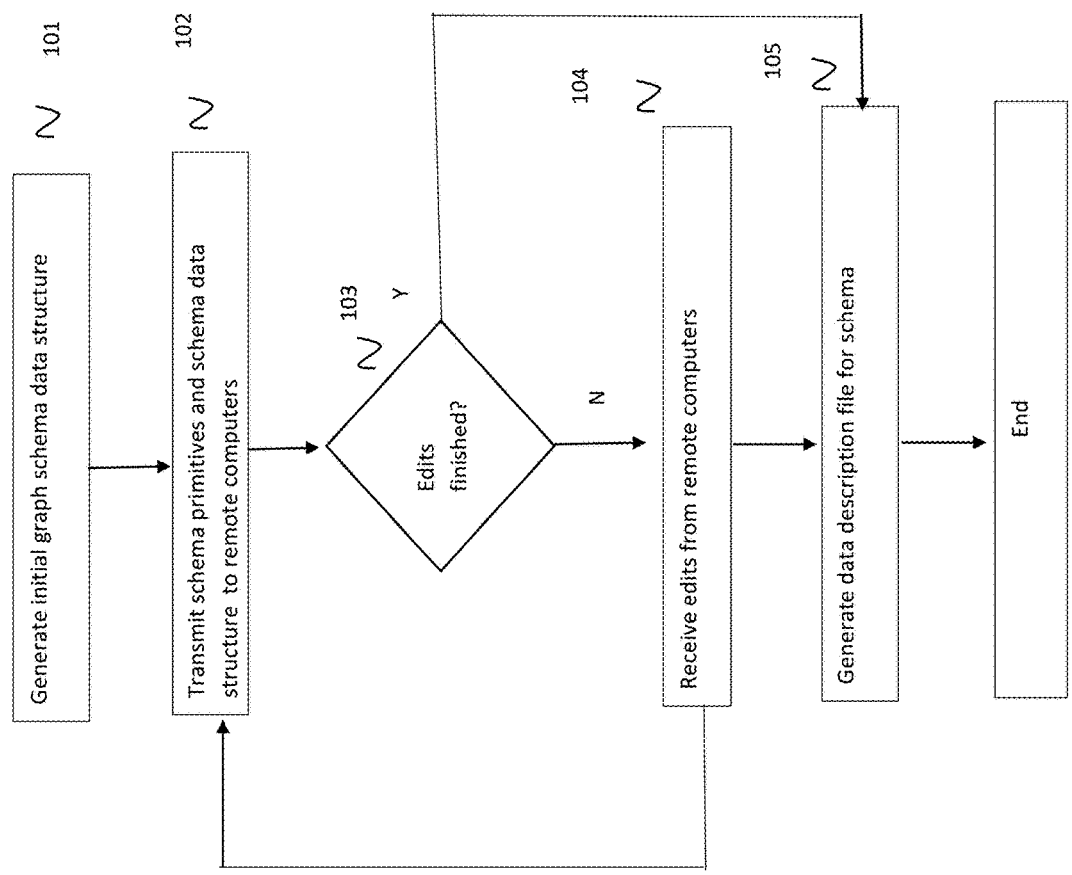
FIG. 1: shows an exemplary flow chart for creating and editing graph schema data structure.
Figure 2:
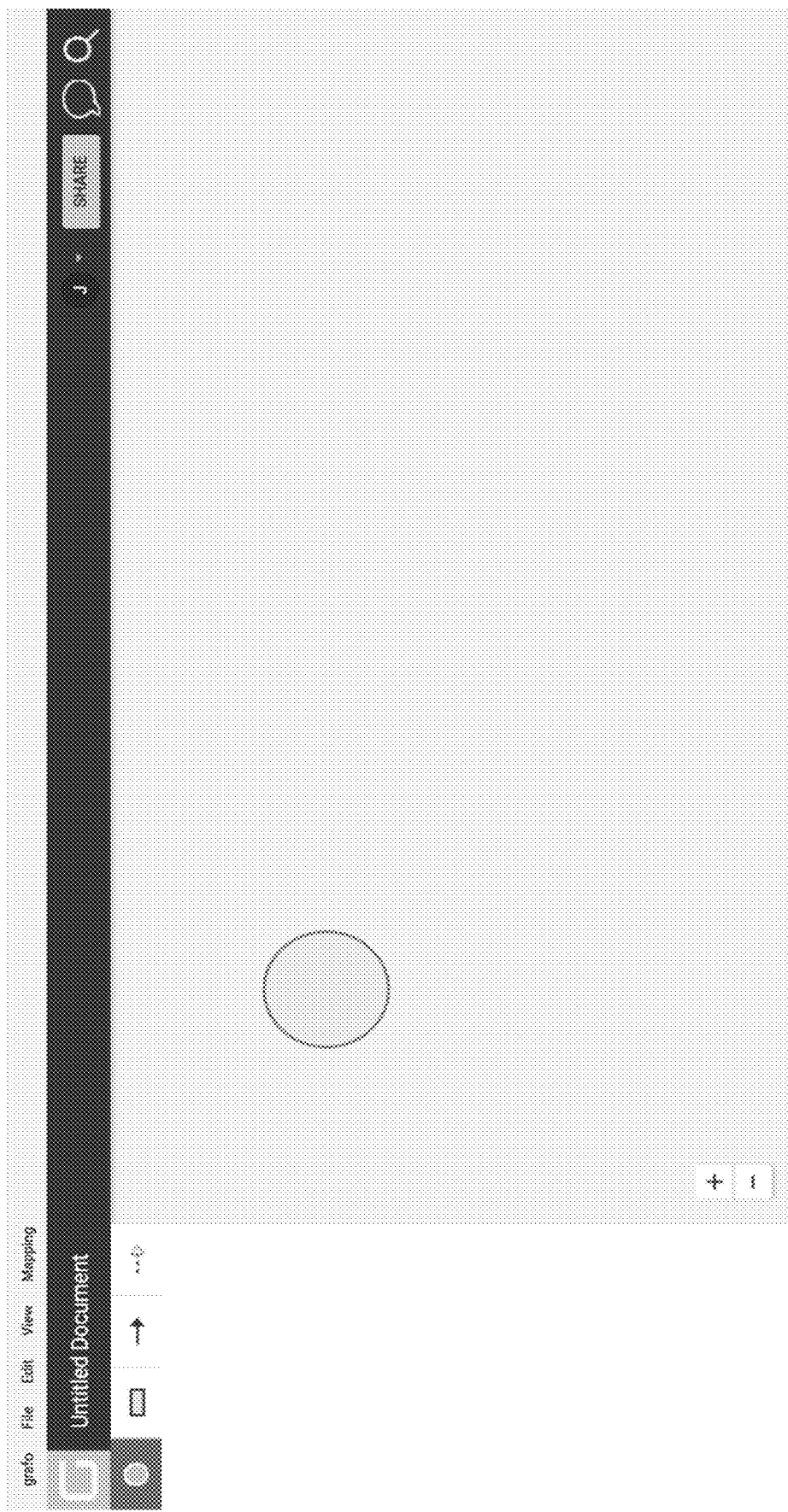
FIG. 2: demonstrates how to visually create the graph schema
Figure 3:
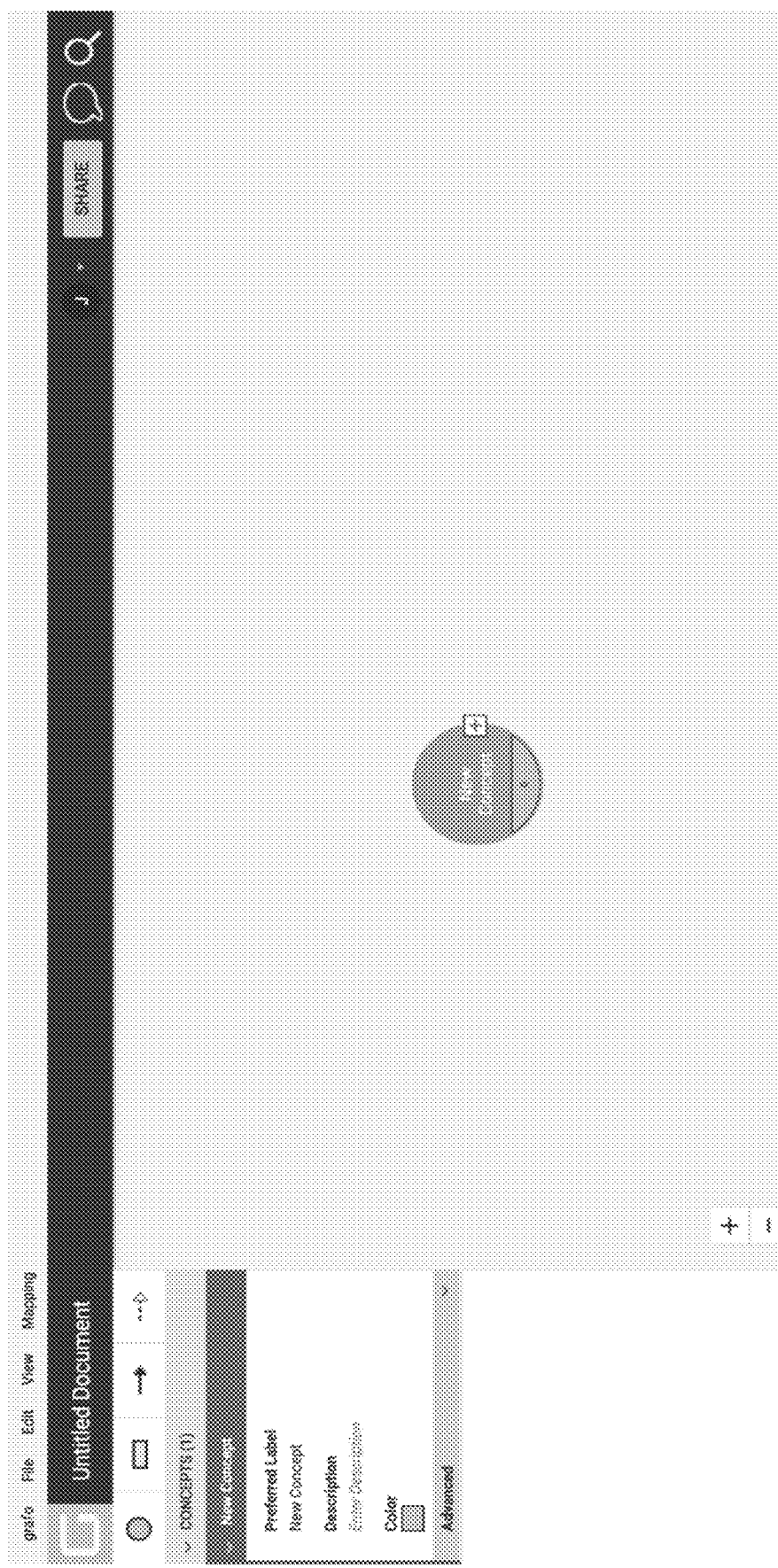
FIG. 3: continues to demonstrate how to visually create the graph schema
Figure 4:
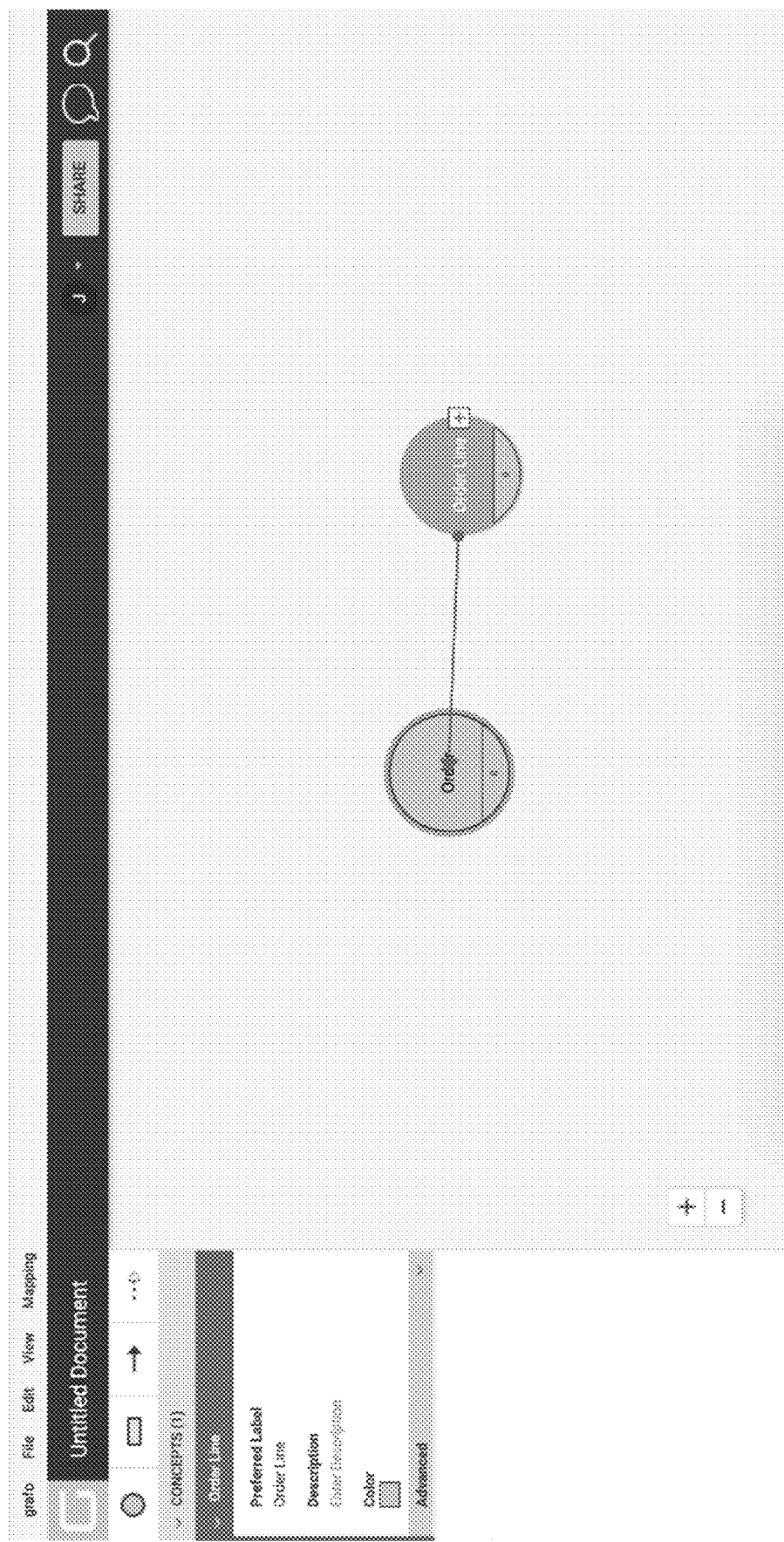
FIG. 4: continues to demonstrate how to visually create the graph schema
Figure 5:
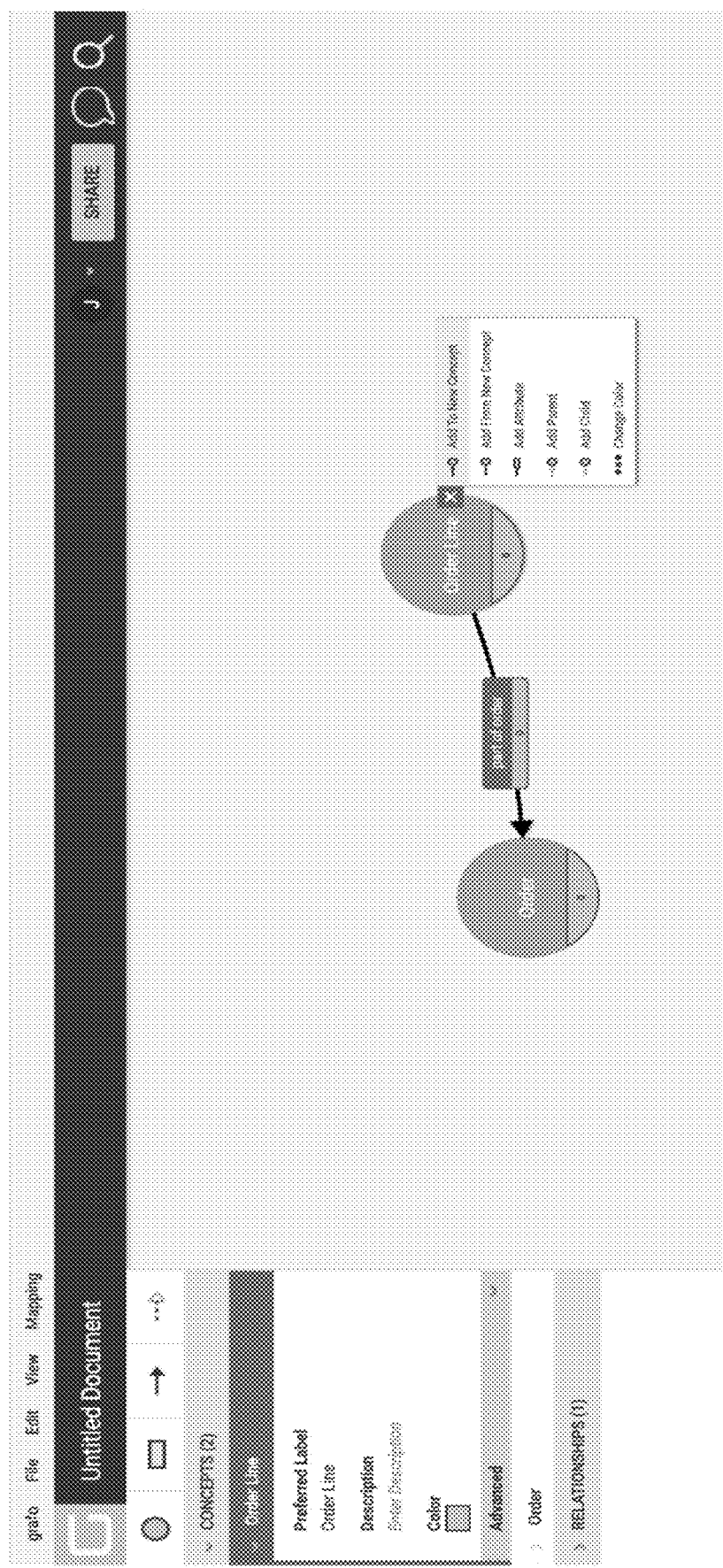
FIG. 5: continues to demonstrate how to visually create the graph schema
Figure 6:
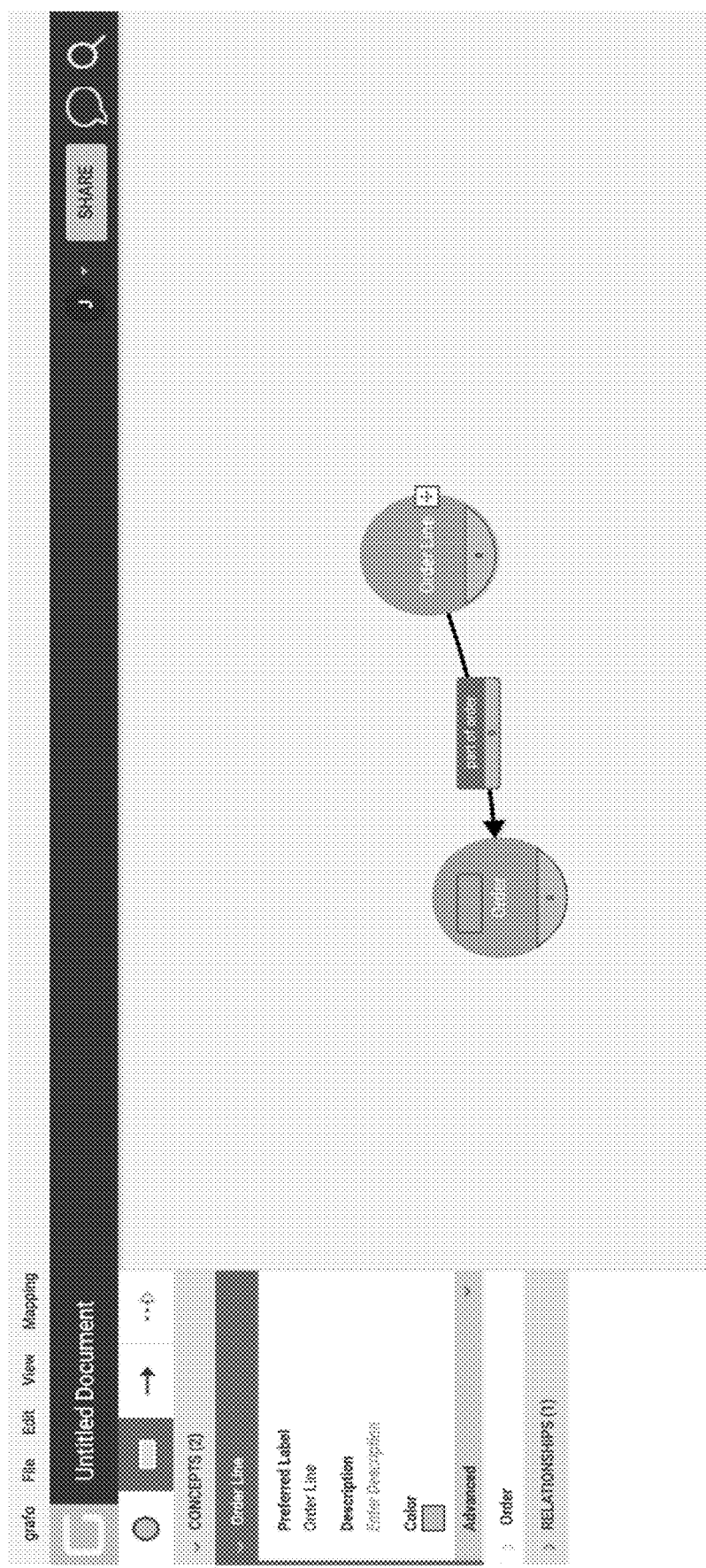
FIG. 6: continues to demonstrate how to visually create the graph schema
Figure 7:
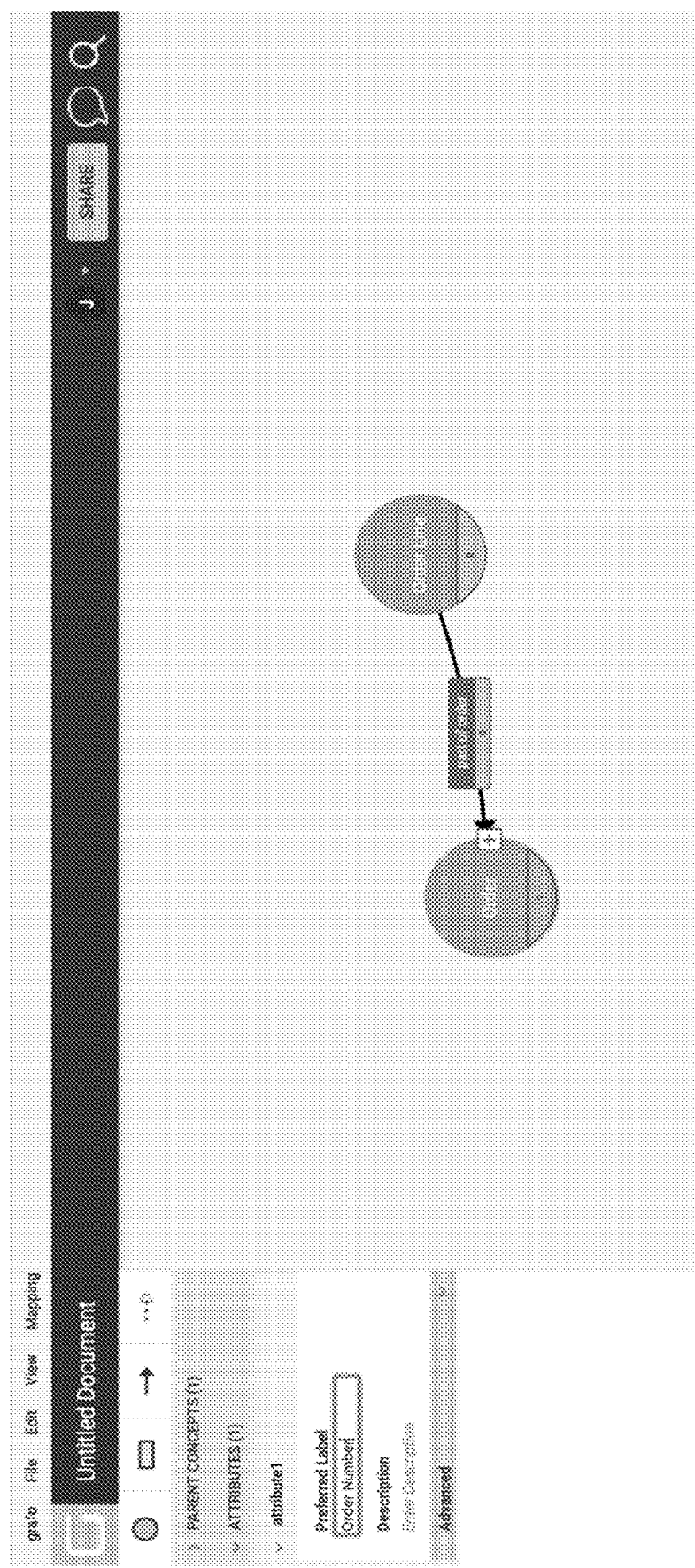
FIG. 7: continues to demonstrate how to visually create the graph schema
Figure 8:
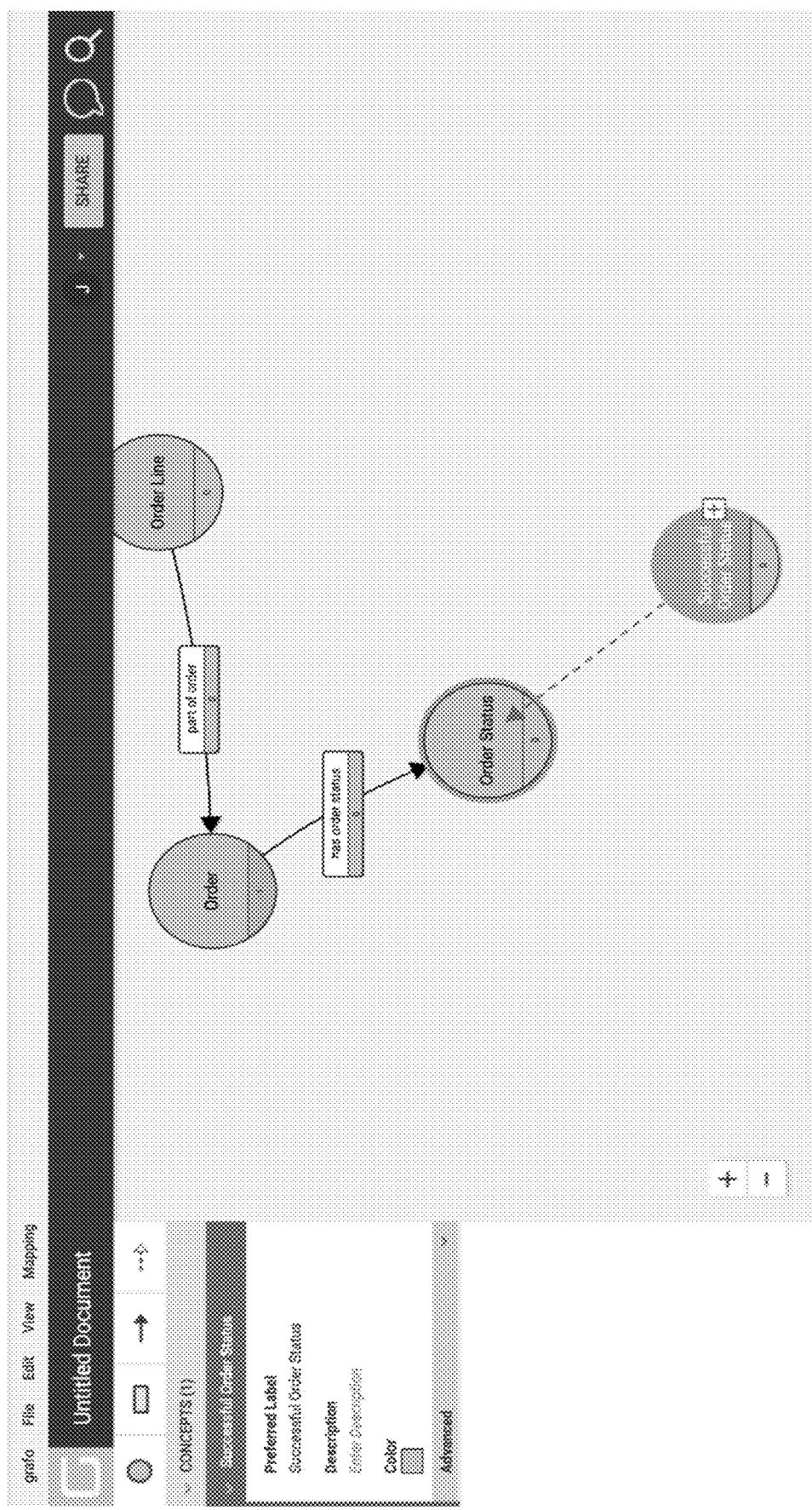
FIG. 8: continues to demonstrate how to visually create the graph schema
Figure 9:
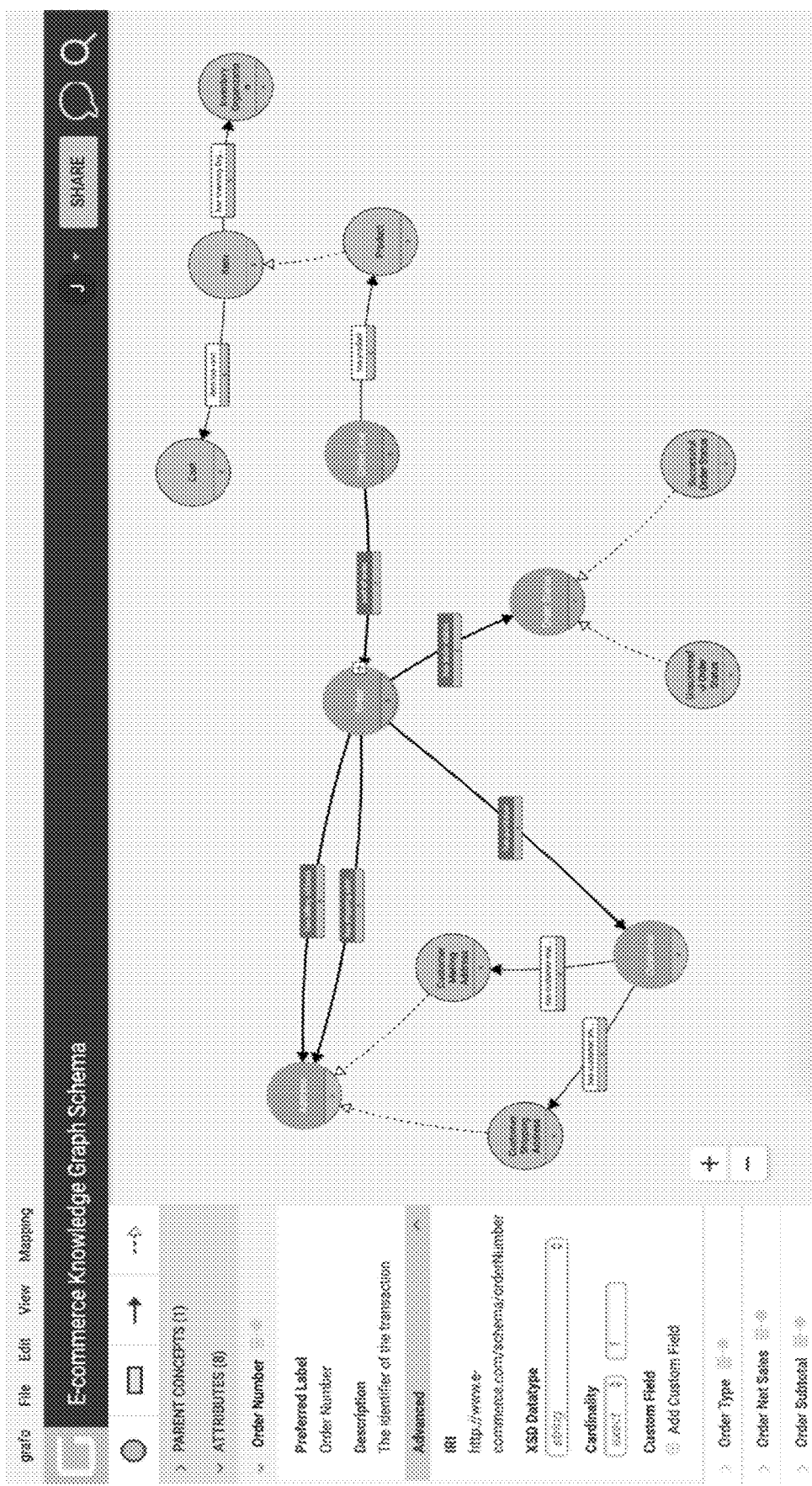
FIG. 9: shows the exemplary datatype and cardinality on the left side
Figure 10:
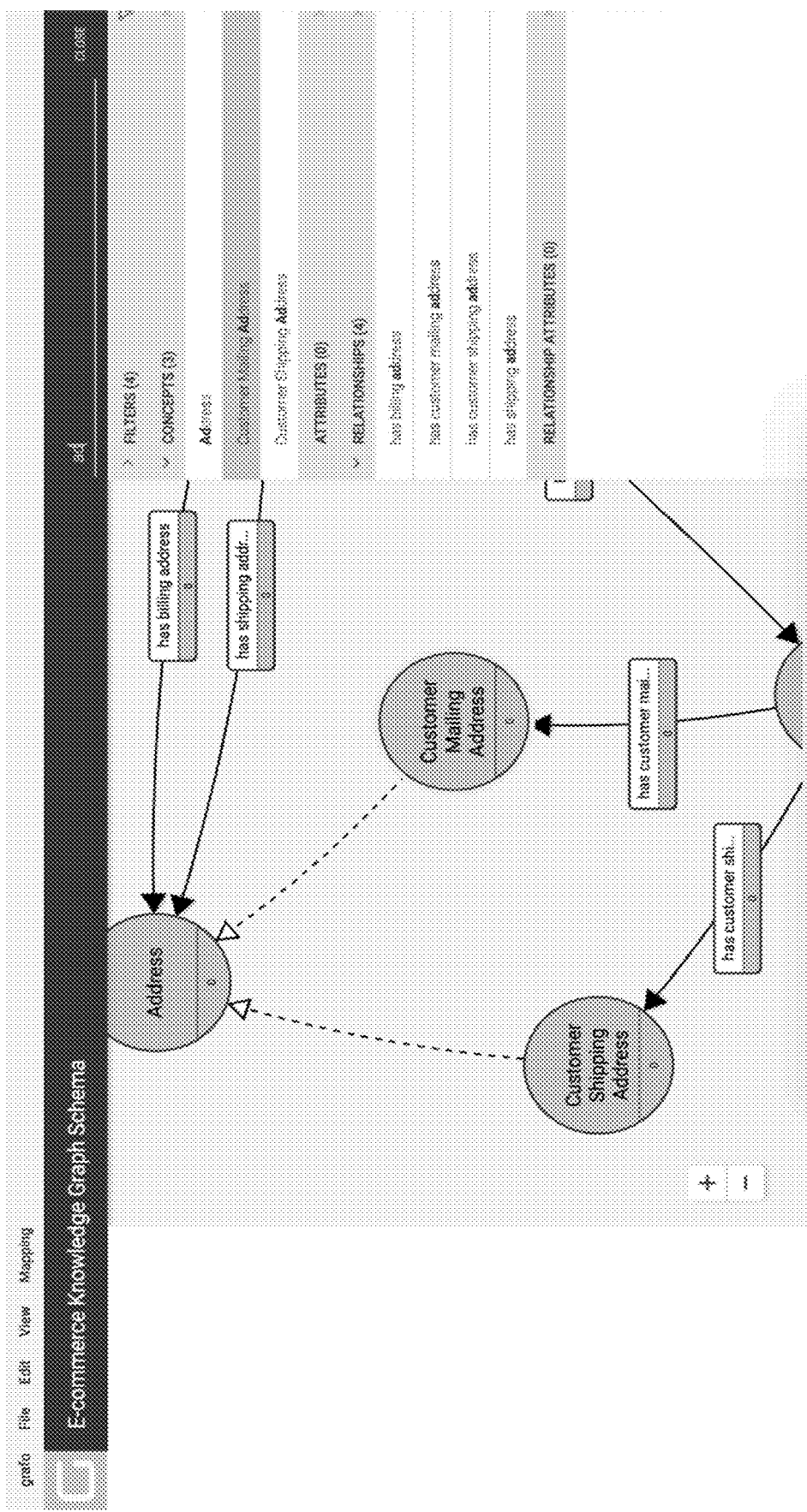
FIG. 10: demonstrates the search functionality
Figure 11:
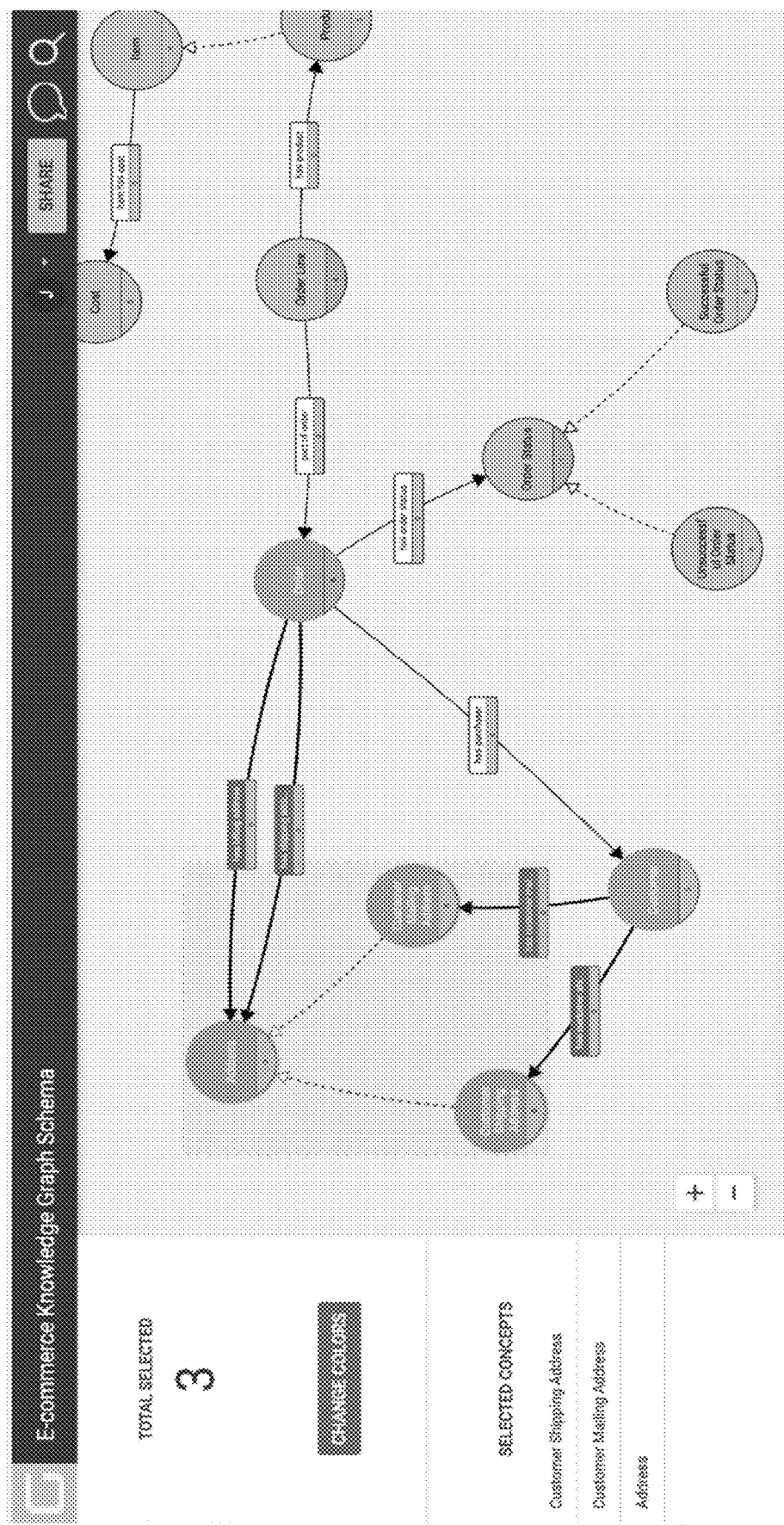
FIG. 11: demonstrates multiselecting, and changes to multiple concepts (move, delete, change color) that are propagated in real time to the remote computers also displaying the graph schema.

The invention provides a graph schema editor function that is collaborative. This system lets users work with graphic primitives like circles, lines, label them, which may be a knowledge graph, or ontology. As shown in FIG. 2, an initial primitive can be used to initiate the graph schema instance. The graphic element is shown in FIG. 3 to be a "concept", and a label and description can be associated with it. The example can be extended where an additional concept is added, and a relationship specified between them (FIG. 4). FIG. 5 shows that the relationship can be assigned a label. FIGS. 6, 7, and 8 show how these elements can be extended to build out the graph schema. The graphical elements are displaying underlying elements of the graph schema, and the relationships between those elements. These data items are stored in the graph schema data structure in a manner where the organization and relationships are preserved in the data structure. The system permits the user to select elements of the graph schema and as a result of the selection, the system uses the graph schema data structure to determine the datatype and cardinality of the selections, which are then displayed to the users operating the remote computers. (FIG. 9). In addition, the system permits the user to input text strings in order to search the schema for the location of those strings. When matching elements in the graph schema are located, the system re-displays the schema to the location where the search results are located. See FIG. 10. The system also permits that multiple items be selected in order to efficiently change or specify attributes or other parameters to the group of selected elements in the graph schema. See FIG. 11.

In some instances, it may be used with a property graph. The server (2304) hosts the instance of the graph schema and lets multiple browsers (2307) access to display and act as a GUI to receive edits from users, (2301) transmit the edits to the server, (2303) where they are incorporated into the graph schema data structure. (2304). For example, a graph schema instance can be initiated and stored as a data structure on the server (101). The schema data structure and its element primitives can be transmitted out (2305) to remote computers that are collaboratively editing the schema. (102). The remote computers then redisplay the graph schema diagram incorporating the new edit. (2306). The server can receive editing commands from the remote computers (103). This cycle continues until the decision is that the editing is completed (103). At that point, a data description file for that graph schema can be generated as output (105). That output file or object can be used by a data querying system to recover data using the graph schema as a location tool. When the server receives an edit, for example, to insert a circle/label/line, (104) it shows up on the screen of each remote computer that is connected to the server (102). This is accomplished by updating the graph schema data structure that is stored on the server and distributing out to the remote computers over a data network the updated graphic information and data structure information that when rendered, displays the revised graph schema. The graphic information may be scripts transmitted to browsers operating on the remote computers. Alternatively, each remote computer may maintain a local copy of the graph schema data structure, and the revisions distributed to the remote computers. In that alternative embodiment, the local data structure is revised and a local module generates the graphic information from the local copy of the graph schema.

In one embodiment, each element of the graph schema that is being edited can be considered a channel where in real time, data that is being input or modified for that element at the server, is transmitted out to the other remote computers in real time in order that the immediate status be displayed. In this manner, multiple users can concurrently edit the same graph schema document at the same time. They can see exactly what other users are doing in real-time (moving elements, creating elements, deleting elements, even multiple elements at a time.). In one embodiment, real time display of the changes is implemented by using an operational transform database to house the graph schema data structure. In another embodiment, real time collaborative editing can be accomplished by diff-match-patch techniques.

Figure 13:
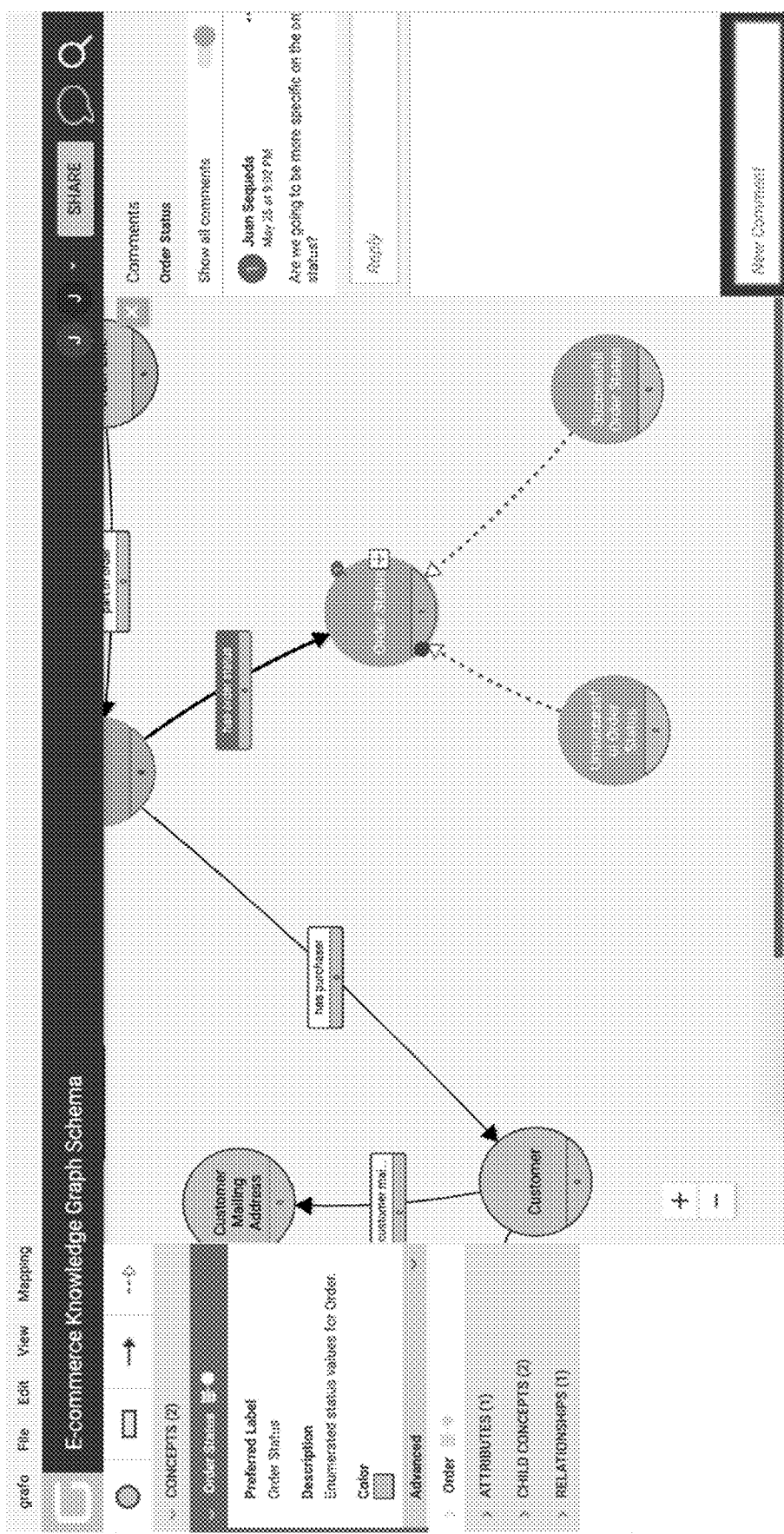
FIG. 13: depicts inputting comments into a chat channel to be stored in the graph schema data structure to be associated with elements of the graph schema, and shared in real time to other computer displaying the graph schema.
Figure 14:
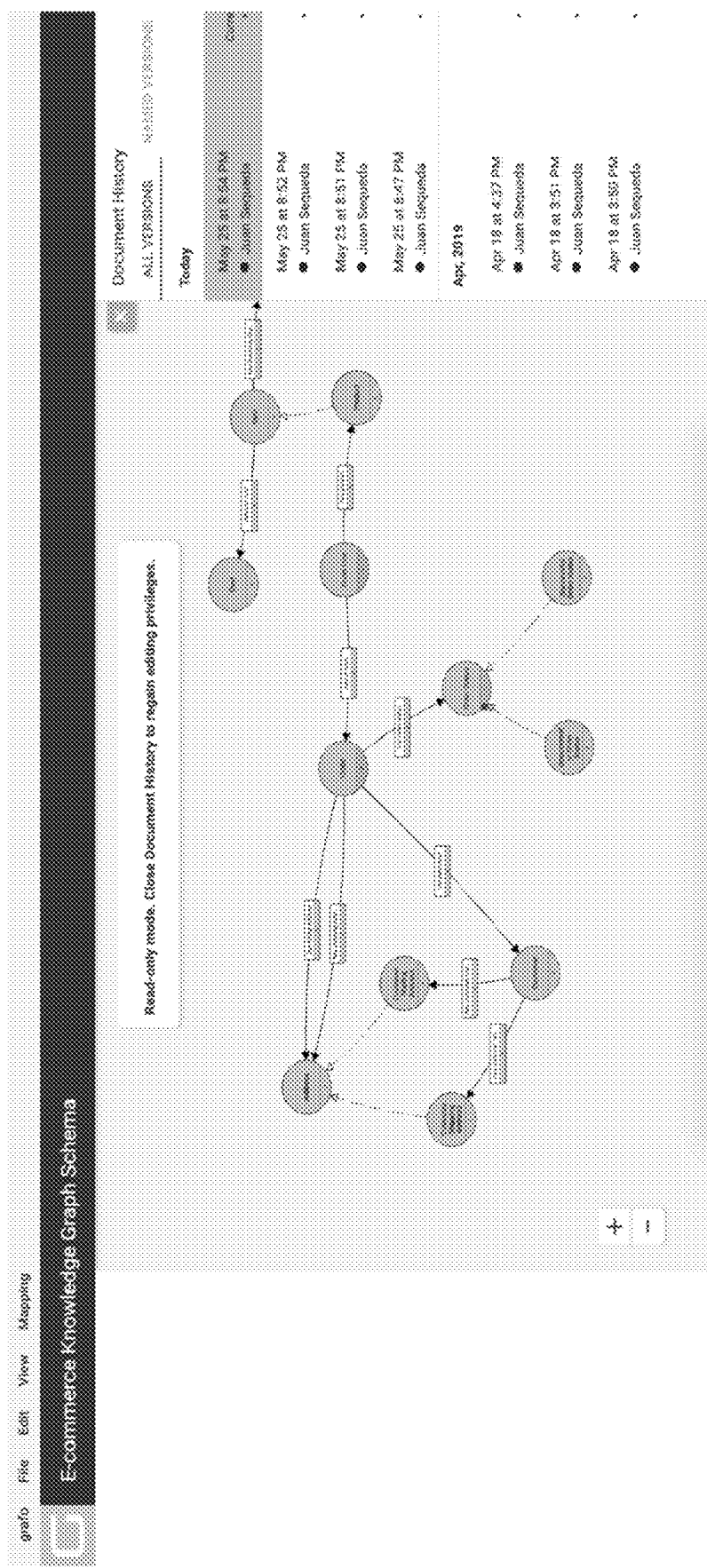
FIG. 14: depicts versions of the graph schema in sequence that can be selected and displayed.

Further, it is possible to establish a chat channel that works with the editing, where the chat channel is associated with the element being edited. In one embodiment, each edge and node in the graph schema data structure can have a separate communication thread that corresponds to it. As shown in FIG. 13, an element of the graph schema can be selected and a chat channel opened into which the user can type a message. This is transmitted out to the other users' remote computers through the server. In one embodiment, the chat channel opens on users who are also viewing the selected element. In another embodiment, the chat channel opens to all users who are viewing the schema. In yet another embodiment, the text of the chat channel is stored on the server, and the graph schema data structure is modified so that the selected element entry in the data structure refers to the chat text data for future reference. The system can save the graph schema data structure as a file or other object. This can be done periodically in order that the evolution of the schema can be tracked, and earlier revisions recovered if necessary. To facilitate this, the system can display on the remote computers a list of versions that can be used as a menu for the user to select from to display the graph schema defined by that version. Each file or data object embodying a version can automatically contain a time-date stamp data as metadata that can be used to track the evolution of the schema.

A graph schema for purposes of this disclosure is a data structure stored in computer memory or on a mass storage device, that represents a directed-labeled graph that includes any of the following: a description of the contents of a graph database, the structure of the contents of a graph database, or database constraints. A database constraint is a logical definition that may prevent certain data from being stored in a database. See "Survey of graph database models", Renzo Angles and Claudio Gutierrez. ACM Comput. Surv. 40, 1, Article 1 (February 2008), which is hereby incorporated by reference. In a preferred embodiment, the representation of a graph database's schema is defined in a manner such that the graph schema is sufficiently consistent with the representation of the graph database data. Thus, the graph schema may be stored as data in the graph database and rendered, as either string or in graphical form such that graph schema and graph database data appear very similar to a user.

Graph databases may exist in several forms. They share the characteristic that the stored data comprises a collection of directed labeled graph edges. A collection of such edges forms a graph. The realization of a graph database concerns two primary implementations: the edge-labelled graphs, and property graphs. In edge-labelled graphs the node labels and edge labels comprise a single data value. In property graphs the node labels and edge labels may further comprise a set of key-value pairs. See "Foundations of Modern Query Languages for Graph Databases", Renzo Angles, Marcelo Arenas, Pablo Barceló, Aidan Hogan, Juan Reutter, and Domagoj Vrgoč. ACM Comput. Surv. 50, 5, Article 68 (September 2017), which is hereby incorporated by reference. Implementations are incorporated by reference in the appendix attached hereto. For example, the W3C Organization published several pages, including those on RDF 1.1 Primer, retrieved from the following URL [https://www.w3.org/TR/rdf11-primer/website] on Jun. 6, 2019 and attached hereto as pages 1 through 9 of Appendix 1, RDF Schema 1.1 retrieved from the following URL [https://www.w3.org/TR/rdf-schema/] on Jun. 6, 2019 and attached hereto as pages 10-25 of Appendix 1, OWL 2 Web Ontology Language Docket Overview (Second Edition), retrieved from the following URL [https://www.w3.org/TR/owl2-overview/] on Jun. 6, 2019 and attached hereto as pages 26-33 of Appendix 1, all of which are hereby incorporated by reference in their entireties for all that they teach. Leading implementations of property graph databases are Neo4j, retrieved from the following URL on Jun. 6, 2019 [https://neo4j.com/developer/kb/viewing-schema-data-with-apoc] and attached as pages 1-2 of Appendix 2, TigerGraph, retrieved from the following URL [https://doc.tigergraph.com/attachments/gsql_dd1_loading_v2.1.pdf] on Jun. 6, 2019 and attached as pages 3-4 of Appendix 2, Datastax Graph, retrieved from the following URL [https://docs.datastax.com/en/dse/6.7/dsedev/datastax_enterprise/graph/using/examineSchema.ht ml] on Jun. 6, 2019 and attached as pages 5-6 of Appendix 2, JanusGraph, retrieved from the following URL [https://docs.janusgraph.org/latest/schema.html] on Jun. 6, 2019 and attached as pages 7-13 of Appendix 2, and Tinkerpop, retrieved from the following URL, [http://tinkerpop.apache.org/] on Jun. 6, 2019 and attached as pages 14-19 of Appendix 2, all of which are hereby incorporated by reference in their entireties for all that they teach.

In an edge-labeled graph schema or ontology, classes can in some embodiments refer to RDFS or OWL Classes, object properties refer to RDFS property or OWL Object Property and datatype properties refer to RDFS property or OWL Datatype Property. In a property graph schema, in some embodiments, nodes refer to the label of the node, relationships refer to the labels of edges and properties are key-value pairs that are associated to nodes and relationships.

In one embodiment, the data structure representing the graph schema, whether an ontology, knowledge graph, property graph or the like, may, in an exemplary but non limiting case, be a table or a group of related tables. The data structure is stored on the server, and commands in the form of scripts is transmitted from server to the browsers of all participating remote computers, and the browsers transmit commands back to the server. The server converts the graph schema representative table to data representing graphical components for display, which are stored on the server. The browser calls down the graphic component data in order to display the graphic representation of the graph schema. The components may also contain text strings representing labelling or values to be associated with the graphical elements that are displayed. The graph schema may be comprised of data elements and data relationships among the elements. The graph schema data structure may be comprised of data representing concepts, attributes or relationships. In one embodiment, these elements and relationships may be represented by one or more RDF tuples, which can include RDF triples. The invention converts the data representing the elements and relationships, for example, RDF tuples, into a set of corresponding graphical component data, which are specific instances of circles, lines boxes, and labels. The graphical representation may be stored on the server and remote computers as a set of data structures, one for each graphical primitive, which includes its type (circle, line, label), its location (x,y), and for a line, its end point (a,b). For a circle, it can specify its size (a number). The data structure for an instance of a primitive will be comprised of one or more pointers to related instances of primitives. In this way, a circle indicating class, may point to a label instance, whose data structure has a "name". Or there may be a pointer in the data structure instance to a line data structure instance, which has two endpoints points comprising it and a label "attribute name." The connections between the components, i.e. the dependency lines between the circles are determined from the dependences present in the graph schema table entries.

The invention is able to produce two kinds of output important to the creation of graph databases and then populating them; Graph schema definition files and mapping files. A graph schema definition file is a text embodiment of a graph schema. This file details the contents and structure of the graph database. This is similar to a file containing SQL data definition language statements (SQL-DDL) such as CREATE TABLE, where in the relational setting a table and its constituent columns named and data types provided. For example, for edge-labeled graphs, files containing text for RDFS or OWL are graph schema definition files. The mapping files detail the contents and structure of an external data connection that is being integrated into the graph schema, as further described herein.

Editing the graph schema is accomplished by the browser receiving the graphical components, in the form of the graphical data structure instances and displaying them on the computer screen. When the user selects an item using the user interface of the computer operating the browser program, the browser can accept a command and transmit a corresponding edit command to the server. The command may be comprised of data representing a location on the browser screen, the identity of the graphic instance, or a selection of a label. These items may be accompanied with data representing move, or text input, or other commands. When the server receives a command to change an instance of what was selected on the browser, the server utilizes the stored graphical component data structures to identify where in the graph schema data structure such an edit should be made. Similarly, the user may select two instances of displayed nodes, and then select a command to establish a relationship between them. Further, the user can select a relationship by selecting the graphic representing the link between the nodes, and then the browser operates a script that permits the user to input a name to label the relationship. The browser then transmits to the server data representing the new instance of a relationship between the two selected nodes and its label.

Further, the graph schema can include as nodes, external sources of data. For example, a graph schema may have a node that delivers data from an external database. The database can be selected with its location specified in a menu. FIG. 15. These external databases may include at least relational databases, graph databases, document databases, hierarchical databases, key value databases, or object databases. In the preferred embodiment, another data structure representing a mapping is created, the mapping relating the characteristics of the node from the standpoint of the graph schema, to the characteristics of the external database. Mapping files contain a collection of entries. This may include the identification of an individual database, its meta-data and network access information. It will include entries that represent individual mappings, where a mapping identifies a node, edge or attribute in the graph schema and a corresponding data acquisition routine. In edge-labeled graph databases R2RML (Relational to RDF Markup Language, a W3C standard) is an example of a language used to define the syntax and semantics of the contents of a mapping file.

Figure 16:
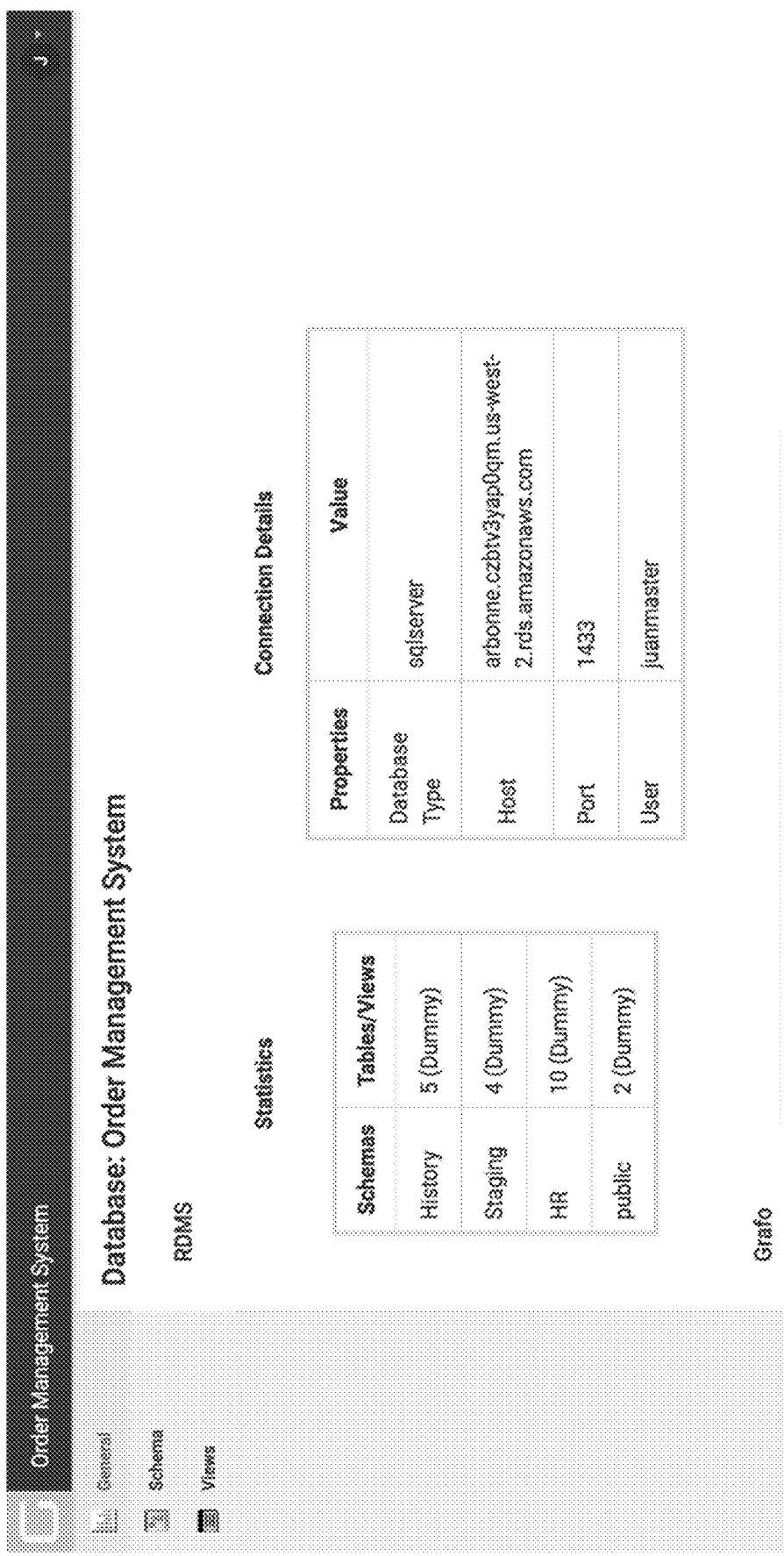
FIG. 16: depicts the user interface for displaying metadata about the selected database.

These mappings between the graph schema components and external database can be represented graphically utilizing the graph schema data structure, and incoming edit commands can modify the data structure representing the mapping. Likewise, the server can convert the data structures representing the mapping into a set of instances of graphical element data structure items. The external database may be characterized by metadata. The metadata represents the elements and relationships of content comprising the database. In one embodiment, the metadata may be a file, for example, a relational descriptor or other data file that defines the characteristics of the database. The metadata can be displayed to the user on the remote computer. FIG. 16.

Figure 17:
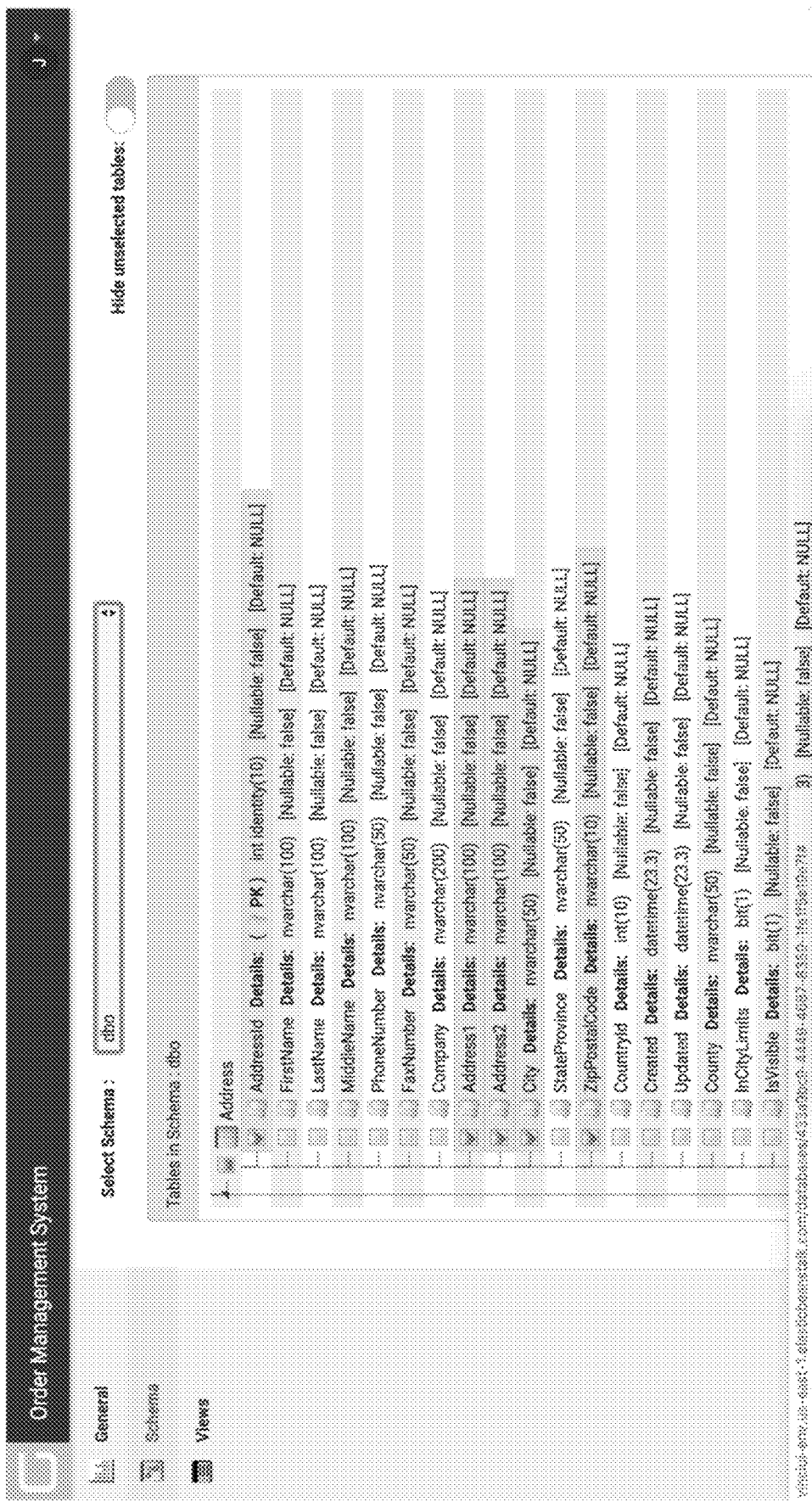
FIG. 17: depicts the user interface for selecting specific content for a mapping.
Figure 18:
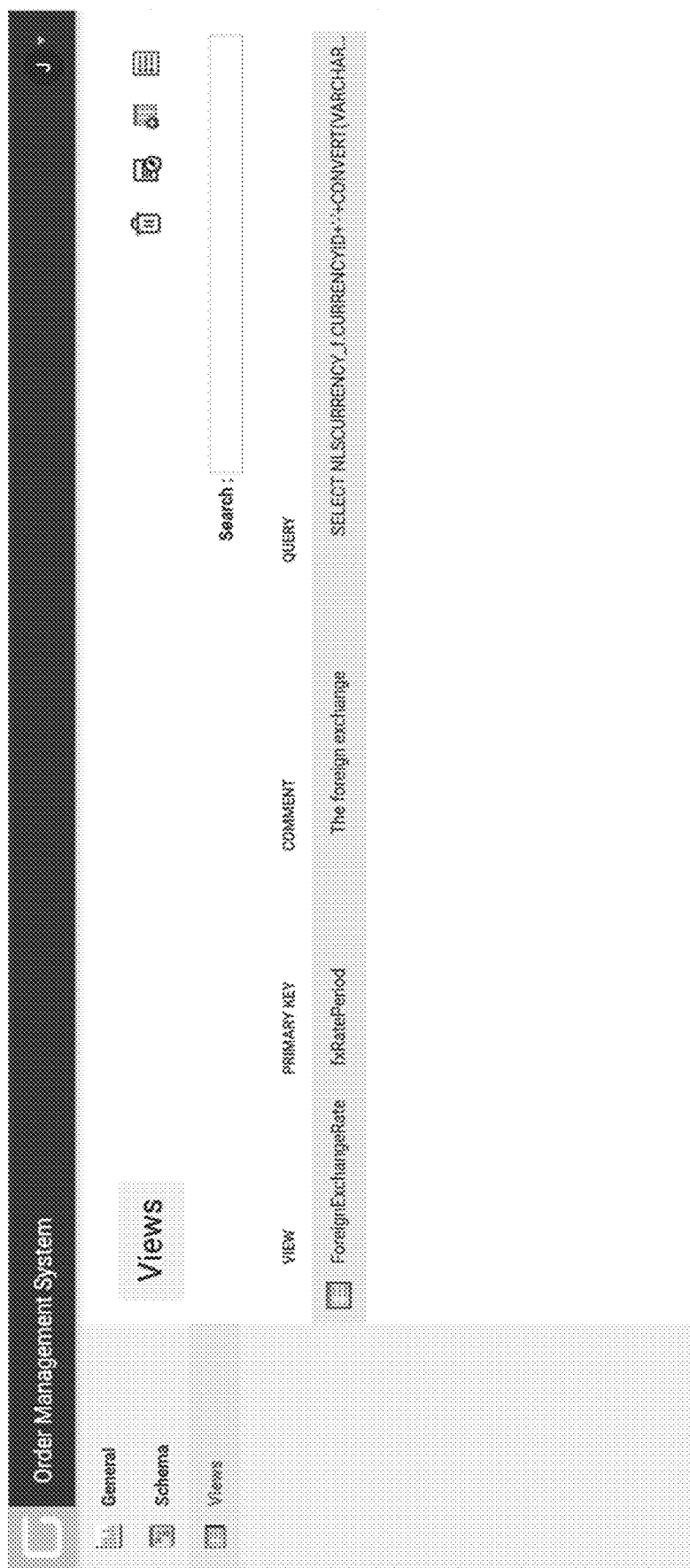
FIG. 18: depicts the user interface establishing a mapping that is a view.
Figure 19:
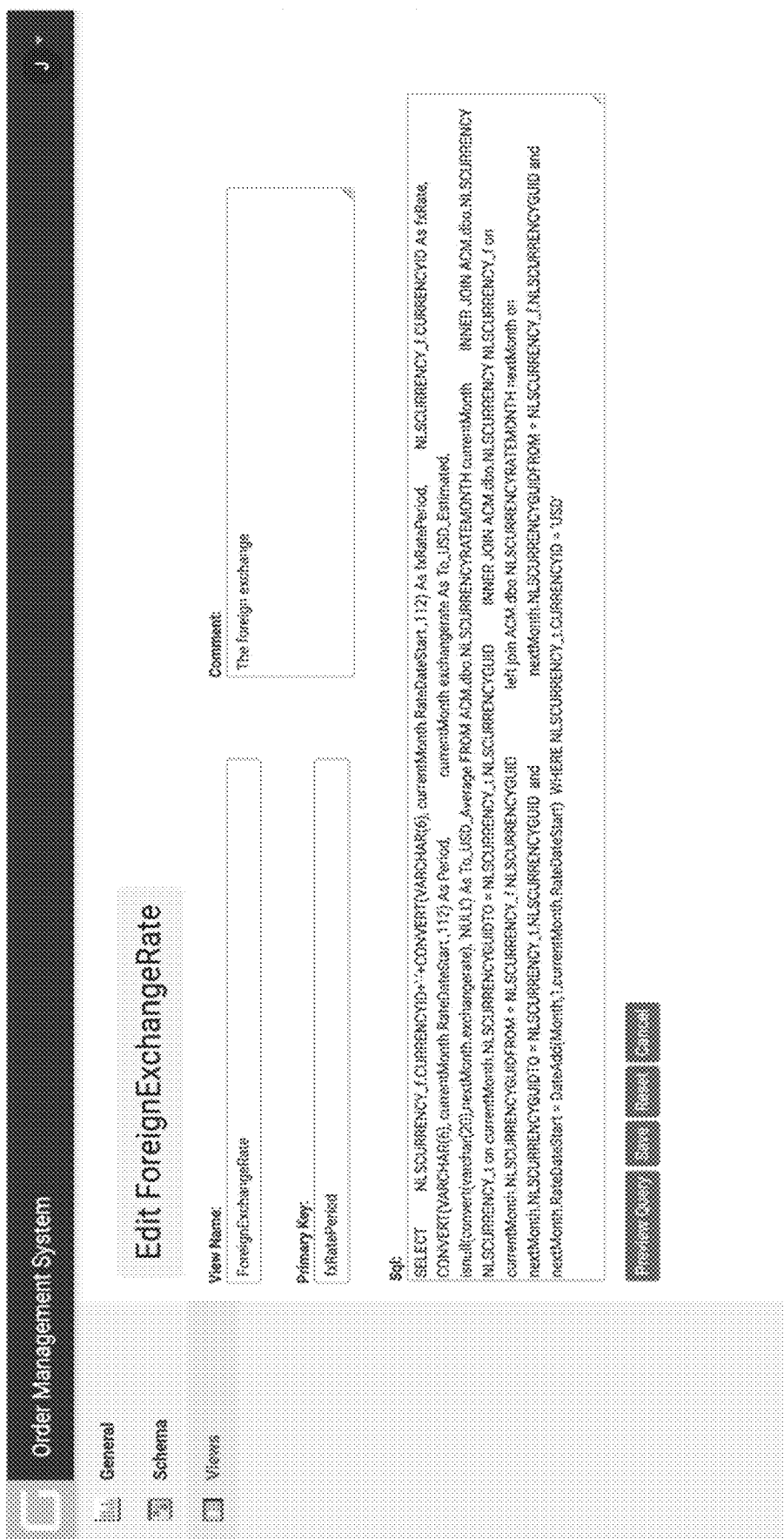
FIG. 19: depicts the user interface for editing the database query that will be mapped too the view.
Figure 20:
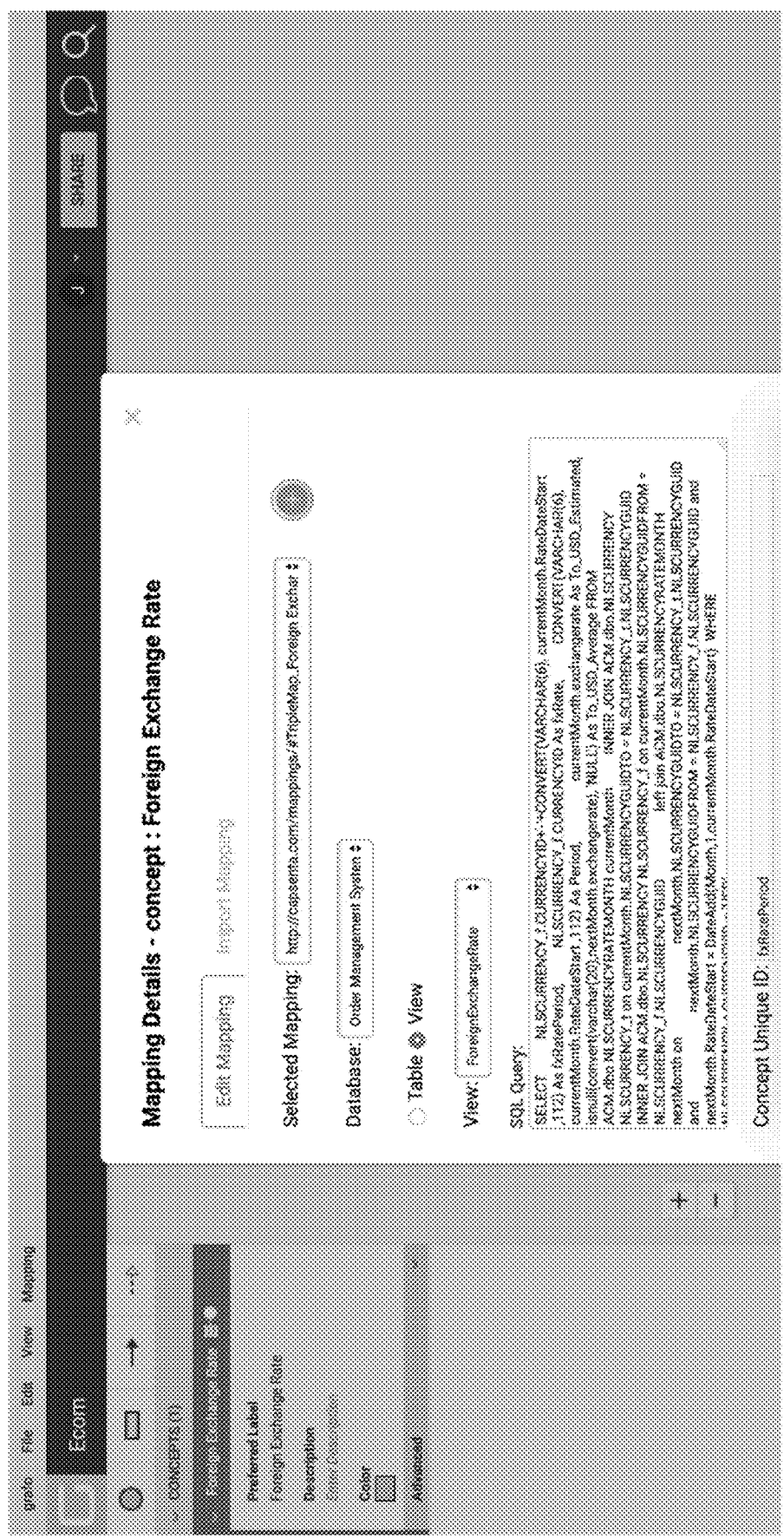
FIG. 20: depicts the user interface for integrating the view into the graph schema as concept.
Figure 21:
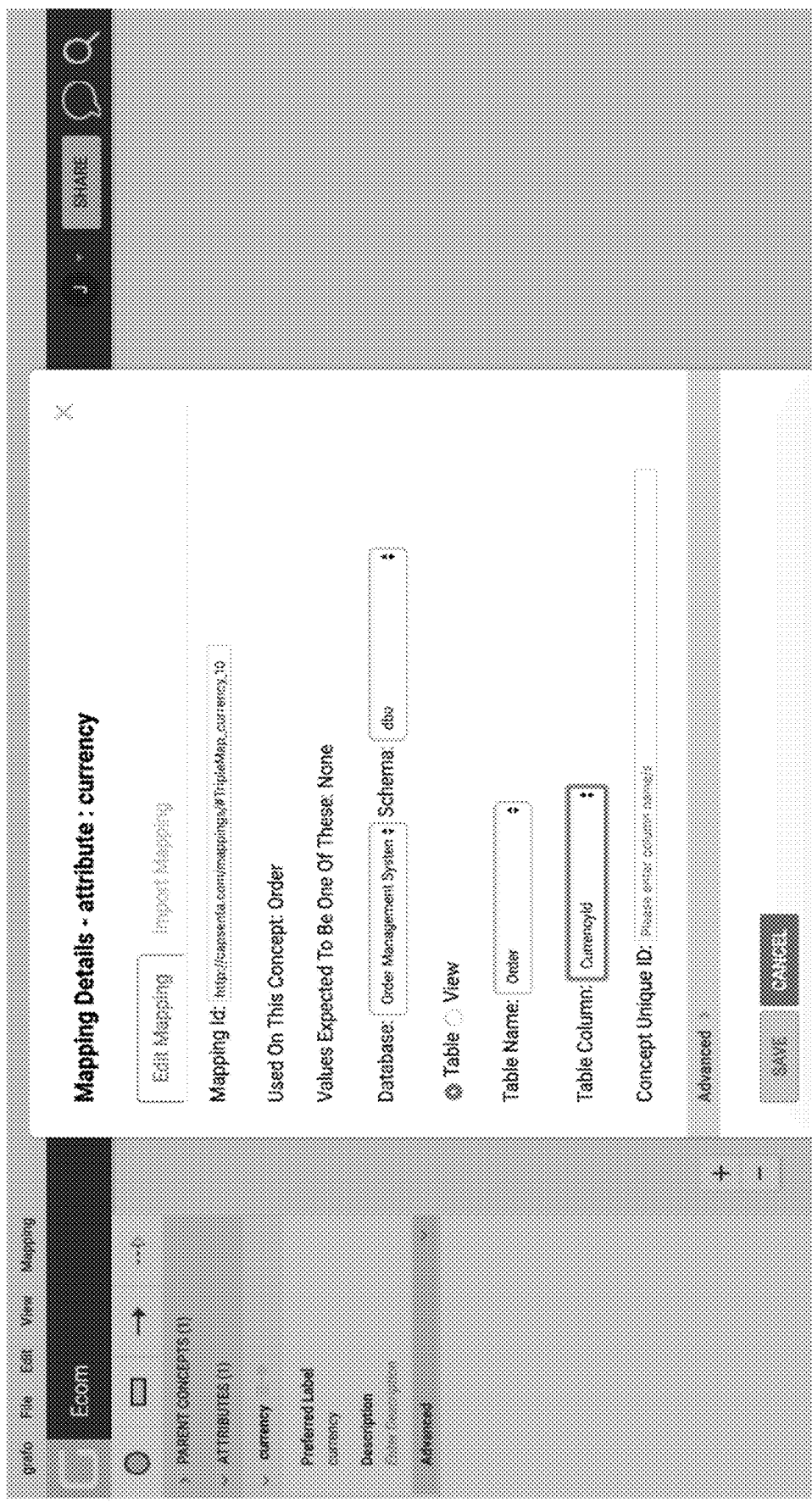
FIG. 21: depicts the user interface for assigning attributes derived from the mapping.
Figure 22:
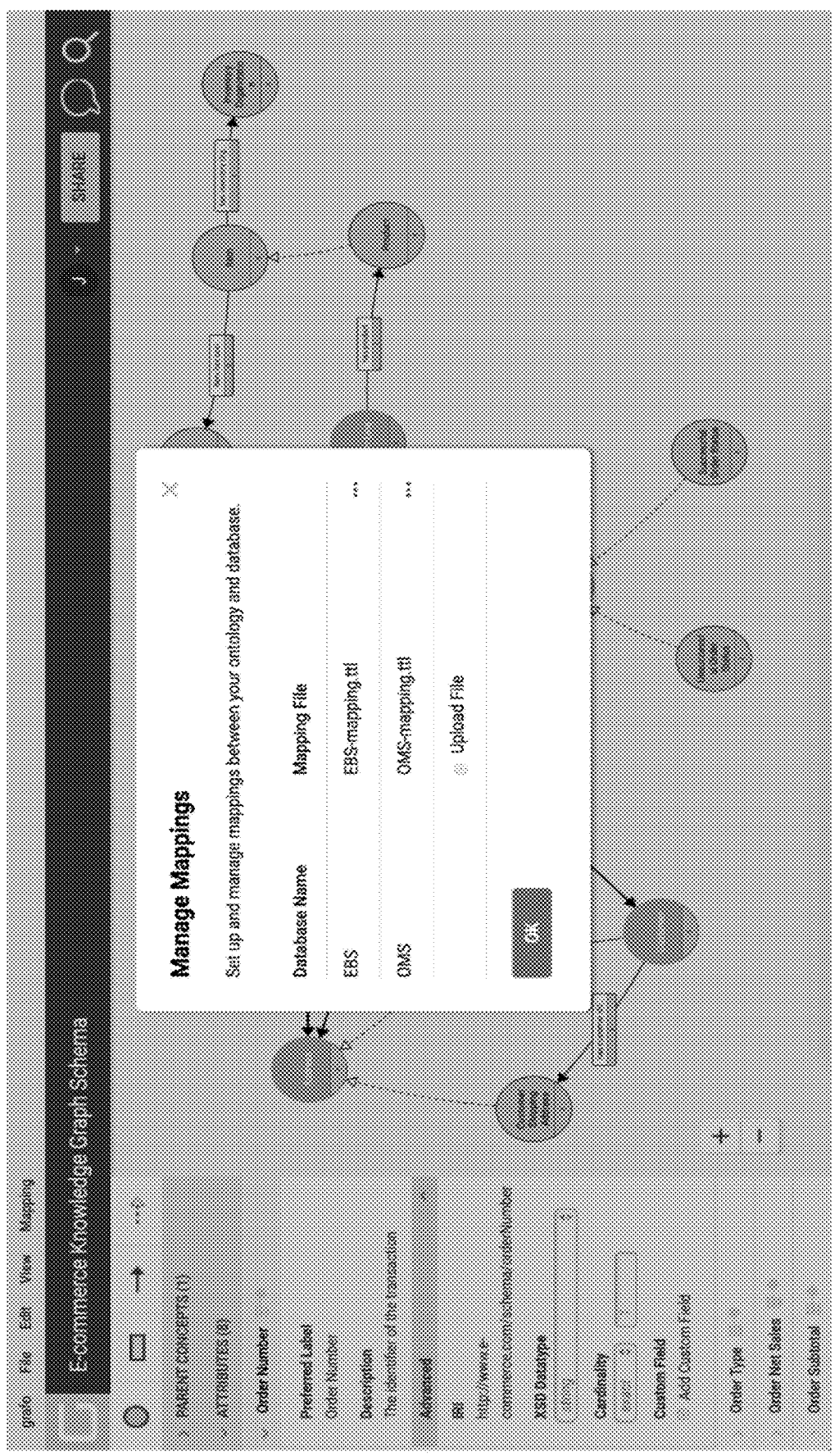
FIG. 22: depicts the user interface for managing multiple mappings used by a graph schema, each mapping represented by a data file containing parameters that define the mapping.
Figure 23:
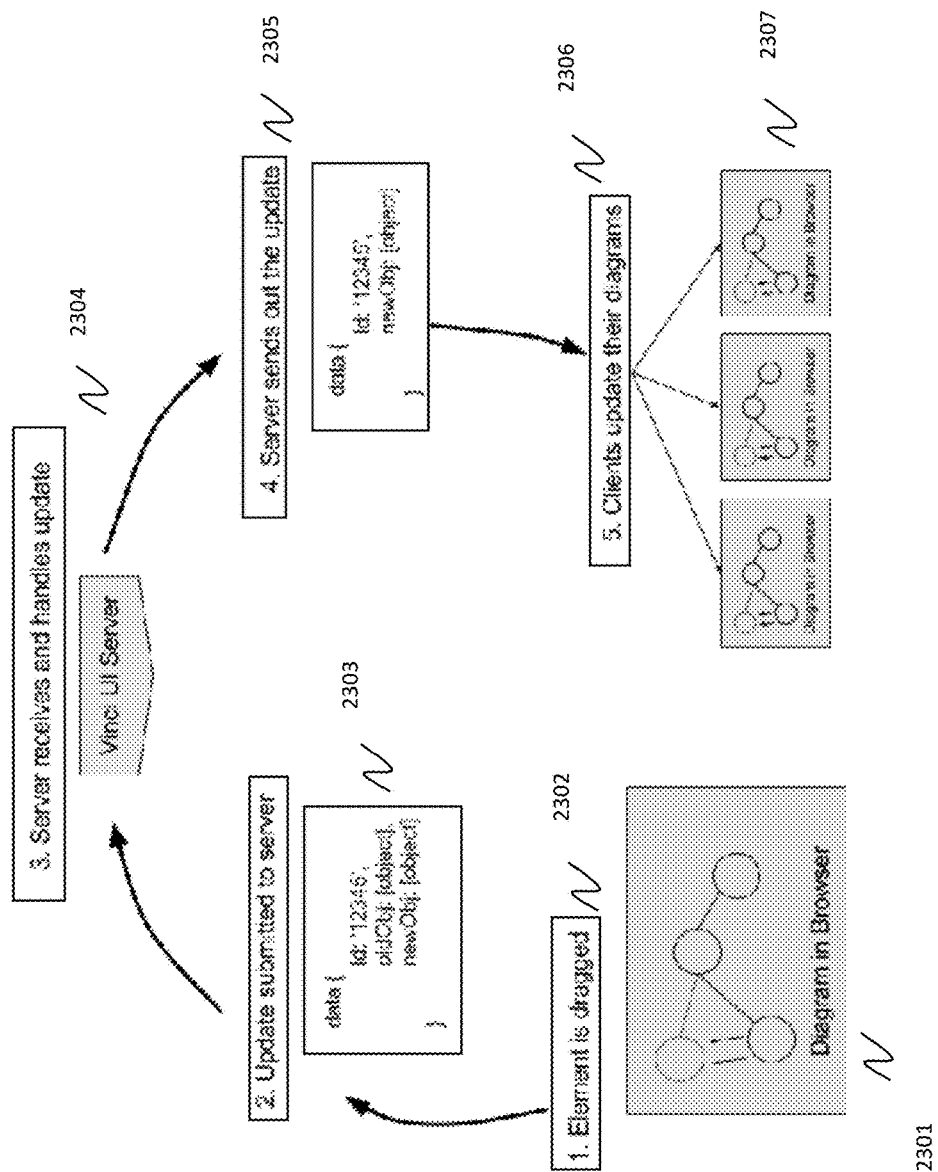
FIG. 23: depicts a flow chart showing how edits to the graph schema input on one remote computer propagate through the server to the other remote computers displaying the graph schema.
Figure 24:
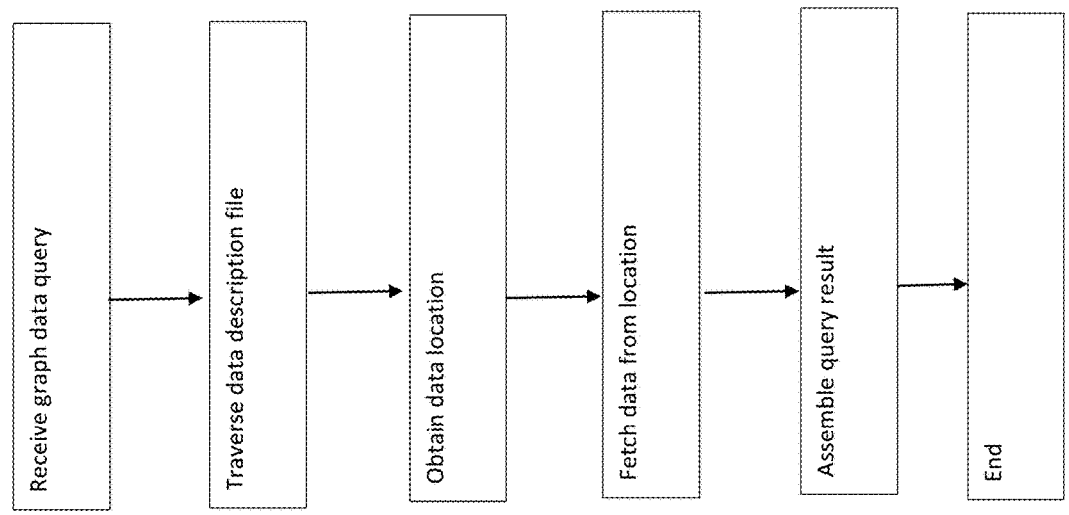
FIG. 24: depicts a flow chart showing the process of using the output of the graph schema editor to facilitate graph queries using the schema.

The invention collects data and metadata from a database in order to use it to interface the external database with the graph schema. Further, the invention provides for the specification of mappings of data and metadata from a database to graph data corresponding to the graph schema. For example, FIG. 17 shows a user interface where specific data items are selected that are related to address data, and each string datatype is presented as well. These are selected by the user inputting a selection input into the interface. All of collecting data, metadata and the specification of mappings can comprise a computer code set that accesses a database and may apply transformations to the data returned by the database. The mapping can be utilized by receiving data representing a query that is applied to the connected database to generate and receive a query result that updates the graph schema data structure to refer to the query result as a concept mapped to an element comprising the graph data structure. For example, a node in the graph schema labeled "person-name" may be associated with a query to an employee database that returns the name(s) of employees. In one embodiment, the query is comprised of data representing computer code that expresses a data acquisition routine. That computer code may be expressed as a query, for example a SQL select-from-where query, and that query may further be embedded in a SQL VIEW statement. In one embodiment, the view and its mapping can be considered an object that is selectable. FIG. 18. The system can present an entire SQL code module that obtains the data, that can be input and edited through the browser operating on the remote computers. FIG. 19. Similarly other computer languages may be used to create a mapping. In the case of graph databases, it could be SPARQL, Cypher, Gremlin, Tigergraph's GSQL. In the case of general purpose computing languages, it could be in Java, Python and others. An example mapping from a concept in a graph schema to a SQL query is shown in FIG. 20. This shows how the data recovered from the database is related to an element in the graph schema. In other embodiments, the data can be retrieved from the database by specifying tables and columns, rather than full queries. FIG. 21 shows an example of an attribute in the graph schema being mapped to a table and column of a database. Each of the mappings between elements of the graph schema and the data sources can be stored in a file in order that it be individually managed. FIG. 22 shows a user interface presenting a user with mapping files already integrated with the graph schema, and a dialogue permitting the user to upload additional an additional mapping file into the schema.

In one embodiment, the system can be used to edit a mapping between a semantic ontology and a relational database. In this instance a data structure representing a graph representation of the mapping is first populated automatically. The relational descriptor file corresponding to the relational database is utilized to create a putative ontology, which can be represented by a data structure, but further, a set of graphical components for a display representation, as further explained in U.S. Pat. No. 8,719,252, incorporated herein by reference. This can then be displayed to the user by transmitting the data out to the remote computers. The system can then accept commands from the user operating the browser as an editing tool, and the user can edit the putative ontology in order that it be customized. The edited putative ontology can then be used to specify the mapping between elements of the graph schema and the contents of the relational database.

In one embodiment of the graph schema, the each Concept, Attribute and Relationship will be associated in the graph schema data structure with data representing the following features ID: a unique identifier within the schema.

Data Type.

Preferred Label: the label is always used for the element.

Alternative Label: A user can attach alternative labels (i.e. synonyms) that are used to call the element.

Definition: a description which defines what is the element.

Each label/description should have a language associated to it.

Permission Roles: a user of the editor function can be assigned a status by the system which defines permission levels for editing as follows:

Owner: can assign permissions including owner, view permissions and sharing, share (per user or public), edit, view and comment Edit: can edit, view and comment Comment: can comment and view View: can view Per user Public via a URL accessible by anyone Users must have an account in the system if they have an Owner, Edit and Comment role. A registered and nonregistered user can have a View role. A user who creates a graph schema "document" is the owner of that schema. The owner of a schema can assign a permission role to any user, including multiple users.

Figure 12:
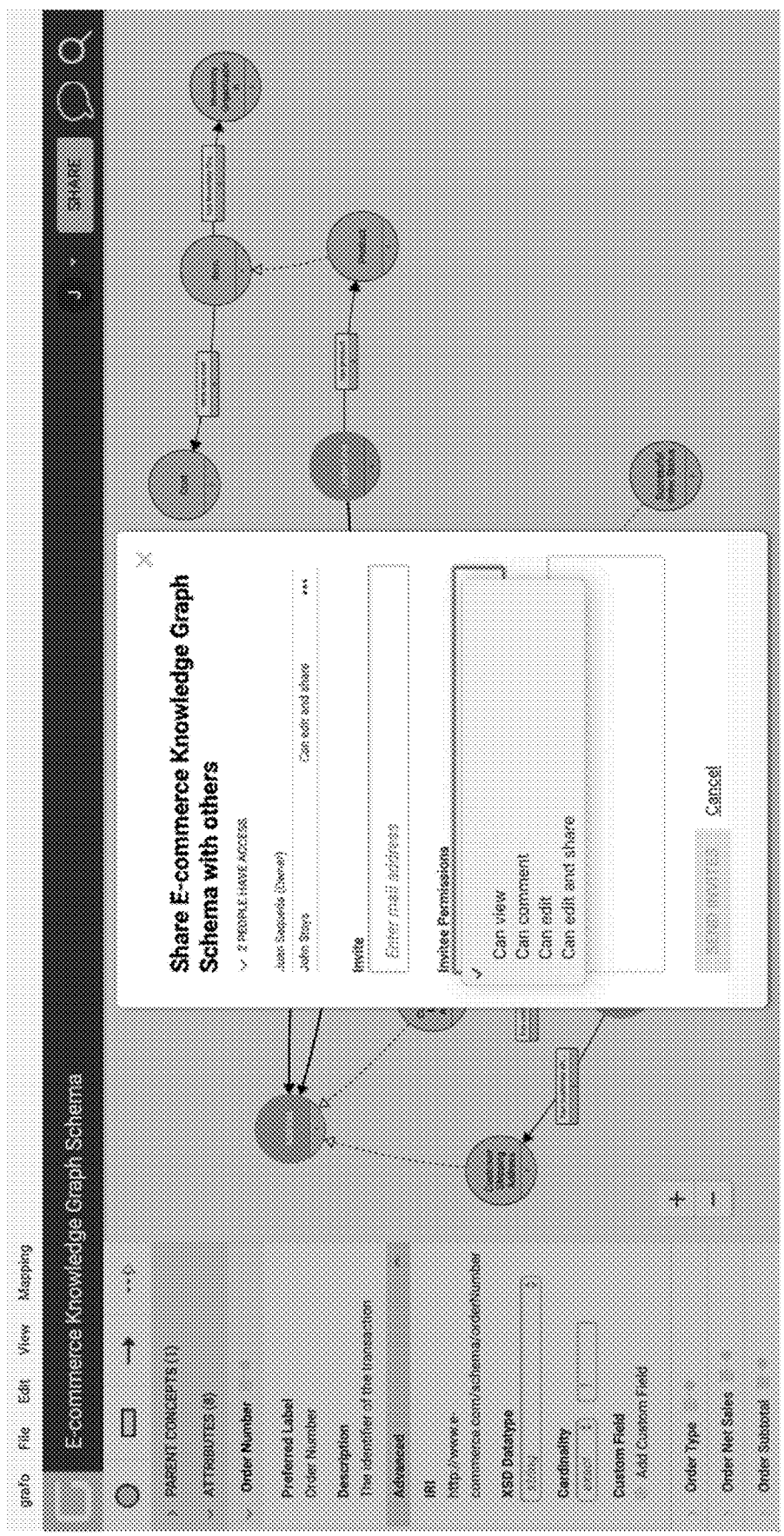
FIG. 12: demonstrates sharing functionality with permission specifications.

In one embodiment, the system presents on the user interface operating on the remote computer of a user a dialogue box that takes as input the identity of a new user, and a selection of the permission level permitted for that user. See FIG. 12.

In one embodiment the system imports a graph schema in the OWL format as a .cap file. Import may be an additive process, where additional OWL formalisms may be added to a graph schema. In addition, the graph schema may exported into the OWL format. The graph schema can also be exported as an image (png, jpeg) and as a pdf.

An important aspect of collaborative editing of the graph schema is providing permission levels to different users. Consider the permission to edit, that is, a write privilege. For example, users may be authorized by parameters stored in a file or data structure associated with their account to have permission to edit a name or definition but not add a new Property or Class. Alternatively, editing Mappings can be permitted to be enabled/disabled independently of anything regarding the graph schema data structure itself. Examples of permission types include:
  Only add things to certain classes. Or certain parts of a graph schema.
  Only view certain parts of a graph schema.
  Groups of users. Assign a group to a subgroup of users of a graph schema.
  Catalog of EKG
  Users can have public/private EKG After a graph schema has been created, it can then be mapped to databases using the database metadata that describes the database, and even files that define the database schema.
Select Source Database Subset
  Select Table
    select attributes from table
    This starts to show automatically on the canvas
      Show the UML/ER version of the part that has been selected
        The user can select the tables and the system will create a diagram that just has those tables
    Primary Key (PK)
      If they exist, then they show up as an icon
      If it doesn't exist, the user can create them.
    Foreign Key (FK)
      If they exist, then they show up as a line between the tables
      If it doesn't exist, the user can create them, by drawing the line
    Create
    VIEW: In this function, the user can write the SQL query and then show the view as the table icon so that attributes will appear.
    In addition, the user can specify the PK and FK
    What to do with NULL values
Every attribute will specify if the attribute can be NULL or not with an icon. If it can be null, then specify what the value should be.
  When a Concept has been created
  select an existing table/view with PK from the organized source databases
  select a table from the original source database or create sql view
  If a Concept has Attributes already created
  after a Concept has been mapped, create line connecting the source table attributes to the target graph schema Attribute
  If a Concept does not have Attributes
  Take the attributes from the source table and drag them to the Concept node.
  Mappings to Relationships
  If a Foreign Key (FK) has been created, then create line between the FK and the Relationship.
  If a FK doesn't exist, then the attribute which represents the FK is the one that needs to be mapped to the Relationship Alternatively, map a source Data Property to a target Object Property. In this embodiment, the system permits the user to edit the R2RML manually to use the template URI as the object.
View Mappings: The system permits ways to show the graph schema in various ways, including any mappings. Several ways are described below:
  Ontology View
  The system shows the entire graph schema.
  The user can select on Concept/Attribute to view the attribute
    The system shows just the table/attribute/view as a string
    The system shows graphically the links to the source database
  Database View
  The system shows the entire organized Source Database
  The user can select on a table/attribute/view
    The system shows just the predetermined name
    The system shows graphically the links to the ontology
  Preview a mapping in graph and tabular form
  Download the mapping as spreadsheet or XLS file
  Export the mapping as a GOOGLE™ sheet
  In addition, colors may be used when displaying the mapping line to indicate the editing status of a mapping element, for example:
    green: approved
    yellow: submitted for approval
    red: development
1. User Input is Captured
  The user interacts with the diagram by clicking and dragging a circle. The point at which this event is captured is customizable. The event can be captured several times per second whenever the "drag" event is called (as is currently implemented), or the event can be captured only at the release of the mouse button (which would only update other clients when the circle is dropped in its final position). The JSON data for the circle is specifically what is captured.
2. Operational Transformation Request Formed
  The client submits a request to the server to make a change to the diagram using Operational Transformation. The client passes the original JSON object of the circle as well as the updated JSON object to the server. A basic flag is also specified that tells the server what kind of change this is (update, delete, etc.).
3. Server Receives the Event
  The server receives the event, parses the information, and updates the diagram document JSON. This is done automatically by ShareDB. This is an ideal way to implement granular permissions, because the event can be "cancelled" based on user permissions.
4. Server Sends Out the Updates
  The server sends any updates it has received out to all of the clients.
5. Clients Update the Diagram
  The clients receive the updates, parse the data, and refresh the diagram as needed. Clients that initiated specific events (like dragging) should choose to ignore their own updates to avoid strange or choppy behavior. This is because the server will send the updates from a client back to the same client, in addition to the rest of the clients.

The graph schema data structure may be output in several ways. First, the data structure, as a table or series of tables may be stored as a data file on mass storage device. This may be performed periodically, with automatically generated filenames so that the evolution of the schema can be maintained. In addition, the graph schema can be converted to outputs to be used in other contexts, for example, as a file defining a set of RDF tuples. The system can also utilize the schema data structure so that the system interfaces automatically between sources of data, including databases, a graph data structures and queries operating on the graph data structure.

In one example embodiment, the operation of the invention by a user, or collaboratively, a set of users to create and develop a graph schema and optionally mappings to a database, form the following data structures. There are five data structures, all expressed in the preferred embodiment as JSON objects. These data structures are presented as examples of one exemplary embodiment but are not intended to be limiting to the data structures that may be used.

1) User data is stored in a My SQL table.
2) the graph schema, which itself may be the union of one or more identically structured JSON objects stored in MongoDB
3) a complex data structure for storing mappings. The component parts of the representation of mappings are stored in a MySQL tables. By complex data structure, it is meant that it is a data structure that contains a number of sub-data structures.
4) a complex data structure storing meta-data and individual strings in a chat thread.
5) a complex data structure that stores, as a log, for example, a JSON file, CVS file, SVN or GIT file, the individual changes made to the graph schema or the mappings. In aggregate, the record of these changes, known in the art as incremental changes, may be used to reconstruct, or, deconstruct, the creation of the graph schema and the mappings.

Note that graph schema ownership, editing privileges and notification status with respect to chat threads are stored as a JSON object within a row of a MySQL database table. Each document is stored in MySQL table and in a Mongodb collection.

In one embodiment, the each graph schema, its associated user status and accumulated chat history is stored as a complex data structure with sub-data structures stored as tuples in MySQL and documents in MongoDB. The sub-data structures are identified as belonging to the same complex data structure using database key values.

There is a one-to-one relationship between a row in the documents table and a collection of a document in mongoDB.

Document Table in MySQL:

```
documents: {
    name: 'documents',
    creationParams: ['id VARCHAR(255) PRIMARY KEY', 'title VARCHAR(255)', 'iri VARCHAR(1000)', 'iriPrefix VARCHAR(255)', 'description TEXT', 'owner VARCHAR(255)', 'ownerCommentNotification VARCHAR(255)', 'lastModified INT', 'dateCreated INT', 'dateDeleted INT', 'parent VARCHAR(255)', 'deleted BOOLEAN', 'needForceDirectedLayout BOOLEAN', 'relBugFixed BOOLEAN'],
    indexQueries. ['CREATE INDEX owner_index ON documents (owner)', 'CREATE INDEX parent_index ON documents (parent)']
}
```

In the preferred embodiment, the graph schema has its own data structure. Each component of the graph schema, node, edge, property (edge-label), and attributes are given unique ids, "id" and "nodeId". Timestamps and identity of the user who last updated the component is recorded [in the object]. Similarly labels, pointers to labels, or other label proxies are stored in the object. As needed by the visualization system, details of where and how individual components of the graph schema are recorded.

The diagram is stored as a JSON document in Mongodb, where the Mongodb collection name is the document ID.

Graph Schema Data Structure:

```
{
    "_id": "data0", // slot name
    "slot": 0, // slot number
    "nodes": { // contains all the nodes in data0
        "node-e9182386-d992-4b99-b67a-cb0a41a89f7f": { // indexed by node ID
            "id": "node-e9182386-d992-4b99-b67a-cb0a41a89f7f",
            "nodeType": "concept",
            "slot": "data0",
            "label": "c1",
            "description": "",
            "fields": [{
                "id": "1f527394-577f-4142-b9a4-45f200f294dd",
                "title": "foo",
                "text": "bar"
            }, ...],
            "lastUpdatedBy": "60a374cd-1167-453d-a063-d04d952939c4", // user ID
            "deleted": false
        },
        ...
    },
    "links": { // contains all links that is connected to nodes in this slot
        "node-e9182386-d992-4b99-b67a-cb0a41a89f7f": { // Indexed by node ID
            "nodeType": "link",
            "nodeId": "node-e9182386-d992-4b99-b67a-cb0a41a89f7f",
            "slot": "data0",
            "peers": [ // stores all links whose source and target are different
                { // Sample link
                    "linkId": "link-f7c92689-499a-44b4-8e37-64579d726f8c",
                    "nodeId": "node-9c8ac7b9-70a8-4fb2-8c3b-fabdd1282e1c", // target node ID or child node ID if this link is in "parents" or "children" array
                    "myNodeId": "node-e9182386-d992-4b99-b67a-cb0a41a89f7f", // my node ID
                    "sourceNodeId": "node-e9182386-d992-4b99-b67a-cb0a41a89f7f", // source node ID or parent node ID if this link is in "parents" or "children" array
                    "label": "op1",
```

```
                "description": "",
                "arrayName": "peers",
                "linkType": "peer",
                "cardinalityType": {
                    "id": 0,
                    "title": "min"
                },
                "cardinality": "1",
                "fields": [ ],
                "color": "#fdc344"
            }
        ],
        "self": [ ], // Stores all links whose source and target are the same
        "parents": [ ], // Stores all links that give this node a parent
        "children": [ ], // Stores all links that give this node a child
        "lastUpdatedBy": "60a374cd-1167-453d-a063-d04d952939c4"
    },
    ...
},
"coordinates": {// Stores coordinates of nodes and self links
    "node-e9182386-d992-4b99-b67a-cb0a41a89f7f": { // Indexed by node ID or link ID
        "nodeType": "concept",
        "nodeId": "node-e9182386-d992-4b99-b67a-cb0a41a89f7f",
        "positionX": -51,
        "positionY": -26,
        "slot": "data0",
        "lastUpdatedBy": "60a374cd-1167-453d-a063-d04d952939c4"
    },
    ...
},
"attributeGroups": {// Stores all attributes for nodes or links in this slot
    "node-f131c0ac-a5fc-4313-812d-d5affac1c7e6": { // indexed by node ID or link ID. This object contains all attributes for this particular node.
        "groupId": "attrGrp-f1683d62-38b1-4152-916f-7440af2d375e",
        "nodeType": "attrGrp",
        "slot": "data0",
        "parentId": "node-f131c0ac-a5fc-4313-812d-d5affac1c7e6",
        "attributeList": [
            { // Sample attribute
                "id": "attr-9f75f480-c8f1-4290-b4b1-bfdcbadaeadf",
                "fields": [ ],
                "nodeType": "attribute",
                "label": "dp1",
                "description": "",
                "xsdDataType": {
                    "id": 9,
                    "title": "dateTime"
                },
                "cardinalityType": {
                    "id": 0,
                    "title": "min"
                },
                "cardinality": "40",
                "groupId": "attrGrp-f1683d62-38b1-4152-916f-7440af2d375e"
            }
        ],
        "lastUpdatedBy": "60a374cd-1167-453d-a063-d04d952939c4"
    },
    ...
},
"iri": { // Stores IRIs for all nodes, links, and attribtues in this slot.
    "node-e9182386-d992-4b99-b67a-cb0a41a89f7f": {
        "iri": "http://www.gra.fo/schema/untitled-ekg#c1",
        "hasEdited": true
    },
    "link-f7c92689-499a-44b4-8e37-64579d726f8c": {
        "iri": "http://www.gra.fo/schema/untitled-ekg#op1",
        "hasEdited": true
    },
    "attr-9f75f480-c8f1-4290-b4b1-bfdcbadaeadf": {
        "iri": "http://www.gra.fo/schema/untitled-ekg#dp1",
        "hasEdited": true
    },
    "linkattr-f5957d12-28fb-43d1-acd6-11e4fbfb6c5e": {
        "iri": "http://www.gra.fo/schema/untitled-ekg#linkattribute3",
        "hasEdited": true
    }
},
"additionalPrefixes": [ // Additional prefixes for the document. These are the default values.
```

```
        {"prefix": "owl", "iri": "http://www.w3.org/2002/07/owl#"},
        {"prefix": "rdf", "iri": "http://www.w3.org/1999/02/22-rdf-syntax-ns#"},
        {"prefix": "xml", "iri": "http://www.w3.org/XML/1998/namespace"},
        {"prefix": "xsd", "iri": "http://www.w3.org/2001/XMLSchema#"},
        {"prefix": "rdfs", "iri": "http://www.w3.org/2000/01/rdf-schema#"},
        {"prefix": "skos", "iri": "http://www.w3.org/2004/02/skos/core#"},
        {"prefix": "dc", "iri": "http://purl.org/dc/elements/1.1/"},
        {"prefix": "foaf", "iri": "http://xmlns.com/foaf/spec/"}
    ],
    "mappings": { // contains all mappings for CARS in this slot
        "node-e9182386-d992-4b99-b67a-cb0a41a89f7f": [ // contains all mappings for this node
            { // A sample mapping object. There are 6 different types of mappings, each requiring
different information.
                mappingId: "http://capsenta.com/mappings#TripleMap_SuccesfulOrderStatus",
                mappingType: "CV",
                dbId: "1ea24423-897e-42e5-9336-3d12c331e799", // source database ID
                fromTemplate: "http://www.arbonne.com/data/orderstatus/{[OrderStatusId]}",
                viewQuery: "select OrderStatusId from OrderStatus where Name not IN ('cancelled', ...",
                imported: true
            }
        ],
        ...
    }
    "_o": "5ba5ded36fe18e39e8a73e6c" // Unique ID given by mongoDB.
}
```

A mapping from a data source into the graph schema may be stored as a complex data structure. Each mapping stored in MongoDB comes from a source database (also called customer database). Mapping can include related tables in MySQL. A mapping may associate a component of the graph schema with a particular database. The first sub data structure stores detailed information concerning the identify, network connectivity and authorization for a database. This can include information about the source database of a mapping.

Mappings Structure

```
customer_databases: {
    name: 'customer_databases',
    creationParams: [
        'id CHAR(36) PRIMARY KEY',
        'display_name VARCHAR(255) NOT NULL',
        'owner_id VARCHAR(255) NOT NULL',
        'date_created INT NOT NULL',
        "db_type VARCHAR(20) CHECK (db_type IN ('unknown',
'postgres', 'mysql', 'oracle',
'sqlserver', 'saphana', 'hive', 'db2', 'h2'))",
        'db_name VARCHAR(255)',
        'db_host VARCHAR(255)',
        'db_port INT',
        'db_user VARCHAR(255)',
        'imported BOOLEAN'
    ],
    indexQueries: [
        'CREATE INDEX IDX_CUST_DB_SEARCH ON
        customer_databases (display_name,
owner_id, imported)'
    ]
}
```

In addition, the system may be comprised of an object that stores which individual databases have mappings connecting them to which individual graph schema. The system can store which document a source database belongs to. In one embodiment, there is a many-to-one relationship between source databases and a document.

Mapping Management Structure:

```
cust_db_doc_correlations: {
    name: 'cust_db_doc_correlations',
    creationParams: [
        'cust_db_id CHAR(36) NOT NULL',
        'ekg_doc_id VARCHAR(255) NOT NULL',
        'date_last_imported INT NOT NULL',
        'imported_file_name VARCHAR(512) NOT NULL',
        'PRIMARY KEY (cust_db_id, ekg_doc_id)'
    ]
    indexQueries: [
        // reverse index helps when queries originate in doc side
        'CREATE INDEX IDX_REVERSE_DOC_DB ON
        cust_db_doc_correlations (ekg_doc_id,
cust_db_id)',
        'ALTER TABLE cust_db_doc_correlations ADD
        CONSTRAINT fk_db_doc_correl_cust_db
FOREIGN KEY (cust_db_id) REFERENCES customer_databases(id)
ON DELETE RESTRICT
ON UPDATE CASCADE',
        'ALTER TABLE cust_db_doc_correlations ADD
        CONSTRAINT fk_db_doc_correl_doc
FOREIGN KEY (ekg_doc_id) REFERENCES documents(id) ON
DELETE RESTRICT ON
UPDATE CASCADE'
    ]
}
```

The system supports chat channels that establish a conversation regarding the elements being edited. These conversations, or series of comments are maintained in a data structure that links them to the elements in the graph schema they refer to. A conversation, or chat thread, is a collection of comments, so there is a one-to-many relationship between conversations and comments.

Comment Tables in MySQL

```
conversations: {
    name: 'conversations',
    creationParams: [
        'id CHAR(36) PRIMARY KEY',
        'documentId CHAR(36) NOT NULL',
        'userId VARCHAR(36) NOT NULL',
        'nodeId VARCHAR(50) NOT NULL',
        'subId VARCHAR(50) NOT NULL',
        'resolved BOOLEAN NOT NULL',
        'dateResolved INT NOT NULL',
        'dateUnresolved INT',
```

```
            'lastResolveUserId VARCHAR(36)',
            'lastUnresolveUserId VARCHAR(36)'
        ]
    }
```

A Comment Associated with a Conversation.

```
comments: {
    name: 'comments',
    creationParams: [
        'id CHAR(36) PRIMARY KEY',
        'conversationId CHAR(36) NOT NULL',
        'isInitialComment BOOLEAN NOT NULL',
        'userId CHAR(36) NOT NULL',
        'dateCreated INT NOT NULL',
        'dateLastEdited INT NOT NULL'
    ],
    indexQueries: ['ALTER TABLE comments ADD CONSTRAINT
    fk_conversation_id
FOREIGN KEY (conversationId) REFERENCES conversations(id) ON
DELETE CASCADE']
}
```

The Actual Content for a Comment.

One-to-one relationship between comments and comment_contents.

```
comment_contents: {
    name: 'comment_contents',
    creationParams: [
        'id CHAR(36) PRIMARY KEY',
        'comment VARCHAR(255)'
    ],
    indexQueries: ['ALTER TABLE comment_contents ADD
    CONSTRAINT fk_comment_id
FOREIGN KEY (id) REFERENCES comments(id) ON DELETE
CASCADE']
}
```

In addition, individual comments in a chat thread can be marked as open or resolved issues. This can track if the conversation is resolved or not. One-to-one relationship between conversations and this.

```
conversation_resolutions: {
    name: 'conversation_resolutions',
    creationParams: [
        'id CHAR(36) PRIMARY KEY',
        'conversationId CHAR(36) NOT NULL',
        'isResolve BOOLEAN NOT NULL',
        'userId CHAR(36) NOT NULL',
        'dateChanged INT NOT NULL',
    ],
    indexQueries: ['ALTER TABLE conversation_resolutions ADD
    CONSTRAINT
fk_conversation_conversation_resolutions_id FOREIGN KEY
(conversationId) REFERENCES
conversations(id) ON DELETE CASCADE']
}
```

Another object can tracks if a user has seen a comment or not. This is used to display the number of unseen comments.

```
user_read_comments: {
    name: 'user_read_comments',
    creationParams: [
        'commentId CHAR(36) NOT NULL',
        'userId CHAR(36) NOT NULL',
        'dateRead INT NOT NULL',
        'PRIMARY KEY (commentId, userId)'
    ]
}
```

Complex data structure may be used to store information, for example as CVS. Each revision is stored in a revision table and a mongoDB document. For every 10 revisions, a full snapshot is saved. A full snapshot is always saved for the first revision of the graph schema document. A full snapshot is simply all data that is stored in {document ID} collection in mongoDB. A revision that is not a full snapshot is a diff of the previous revision. This is calculated by GenerateNewRevision lambda. However, dateCreated must be unique for each revision in a document. In the MySQL revision table, each row has one-to-one relationship with a mongoDB document.

Revisions Structure

```
revisions: {
    name: 'revisions',
    creationParams: ['id VARCHAR(255) PRIMARY KEY',
    'documentId VARCHAR(255)', 'title
VARCHAR(255)', 'dateCreated INT', 'author VARCHAR(255)', 'authorId
VARCHAR(255)',
    'notes LONGTEXT', 'isFullSnapshot BOOLEAN'],
    indexQueries: ['CREATE INDEX revision_doc_id ON revisions
    (documentId)']
}
```

In the MongoDB revision collection, the Collection name is {document ID}-revisions and each MongoDB document inside the collection is a revision.

Sample Revision Document:

```
{
    "_id": "5cef1b41cc57ef5e28d53dd0", // ID generated by mongoDB
    "id": "280b02d7-e904-4a5d-86f2-25ddf76ae4eb", // revision ID
    "data":[...] // Revision data. This will be an array if the revision is a
    full snapshot. It will be an
object otherwise.
}
```

Operating Environment:

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it remotely using a network. In one embodiment, the user's computer is omitted, and instead an equivalent computing functionality is provided that works on a server. In this case, a user would log into the server from another computer over a network and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In one embodiment, a user's computer can run an application that causes the user's computer to transmit a stream of one or more data packets across a data network to a second computer, referred to here as a server. The server, in turn, may be connected to one or more mass data storage devices where the database is stored. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In addition, the user's computer may obtain data from the server that is considered a website, that is, a collection of data files that when retrieved by the user's computer and rendered by a program running on the user's computer, displays on the display screen of the user's computer text, images, video and in some cases outputs audio. The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (TO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. In some embodiments, data stored in memory may be stored in the memory device, or an external mass data storage device like a disk drive. In yet other embodiments, the CPU may be running an operating system where storing a data set in memory is performed virtually, such that the data resides partially in a memory device and partially on the mass storage device. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. For example, the CPU may obtain two data values from memory and the logic in the CPU determine whether they are the same or not. Based on such Boolean logic result, the CPU then selects a first or a second location in memory as the location of the next step in the program execution. This type of program control flow may be used to program the CPU to determine data, or select a data from a set of data. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more elements, encoded into computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

The invention claimed is:

1. A computer system comprised of a server said computer system for editing a data structure representing a graph schema, said graph schema comprised of data elements and data relationships among the elements, said system comprising:
   on the server, a graph schema data structure stored in memory;
   on the server, an interface module that receives as input a location reference to at least one database connected by a data network to the server and stores the location reference in the graph schema data structure associated with one or more nodes configured to deliver data from an external database or any other database including the at least one database that includes a relational database configured to generate a data description file generated as output the graph schema when one or more remote computer devices configured to collaboratively edit a graph schema diagram associated with the graph schema have completed collaboratively editing the graph schema diagram, the data description file being used by a data querying system to recover responsive data using the graph schema as a location tool;
   on the server, a visualization module configured to transmit data representing at least part of the graph schema data structure to cause display of primitives as graphical image data at the one or more remote computer devices, the graphical image data being configured to visually depict the data elements and data relationships among the elements of the graph schema at user interfaces of the one or more remote computer devices;
   receiving data representing a plurality of edits to the graph schema data structure;
   on the server, an editing module that is configured to receive data representing an event at one of the user interfaces, the event being first input data that comprises a data object that indicates one or more modifications of the graph schema, the editing module being further configured to modify the graph schema data structure based on the first input data to form a modified graph schema data structure responsive to collaborative editing of the graph schema via one or more graph schema editors correspondingly associated with the one or more remote computing devices that provide data representing inputs including the first input data and other inputs associated with the plurality of edits, the one or more remote computing devices being configured to be communicatively coupled;
   establishing a chat channel to transmit data associated with at least one edit to a local copy of the graph data schema structure stored on at least one of the one or more remote computing devices, the data being transmitted to a plurality of remote computers in data communication with the server; and
   on the server, a communication module configured to transmit a script to the plurality of remote computers, the script including data configured to present visually the modified graph schema data structure as an update to one or more local copies of the graph schema data structure stored on each of the one or more remote computing devices, the data being presented visually in real-time on a display associated with each of the plurality of remote computers of the at least one edit.

2. The system of claim 1 where the interface module generates a mapping data by using a database schema retrieved from the database location to generate a putative ontology corresponding to the connected database.

3. The system of claim 2 further comprising a comparison module that compares the graph schema data structure to the putative ontology data structure.

4. The system of claim 3 where the comparison module identifies the portions of the graph schema data structure that most closely match the putative ontology.

5. The system of claim 1 where the interface module generates a mapping corresponding to the database and updates the graph schema data structure with references to at least one content in the database using the generated mapping.

6. The system of claim 5 where the mapping data is comprised of a SQL query.

7. The system of claim 5 where the mapping data is comprised of a SQL View.

8. The system of claim 5 where the mapping data is comprised of a graph query.

9. The system of claim 5 where the mapping data is comprised of computer code representing a data acquisition routine.

10. The system of claim 5 where the interface module generates the mapping by receiving input metadata that represents characteristics of the connected database.

11. The system of claim 10 where the input metadata represents the elements and relationships of content comprising the database.

12. The system of claim 1 where the interface module generates a mapping data by receiving data representing a query that is applied to the connected database to generate and receive at the interface module a query result and updates the graph schema data structure to refer to the query result as a concept mapped to an element comprising the graph data structure.

13. The system of claim 12 where the query is a VIEW construct and the database is a relational database.

14. The system of claim 12 where the query is comprised of computer code expressing a data acquisition routine.

15. The system of claim 1 where the graph schema data structure is comprised of data representing nodes, edges and attributes associated with the nodes and edges.

16. The system of claim 1 where the graph schema data structure represents an edge-labeled ontology graph, said ontology graph comprised of nodes representing classes, edges representing object properties between the nodes and datatype properties representing the attributes associated with the nodes.

17. The system of claim 1 where the graph schema data structure represents a property graph schema, said property graph schema comprised of nodes, edges representing relationships between the nodes, and properties representing attributes of the nodes and edges.

18. The system of claim 1 where the connected database is one of: relational database, graph database, document database, hierarchical database, key value database, object database.

19. The system of claim 1 further comprising an at least one remote computers connected to the server using a data network, each of the at least one remote computers comprised of a channel module that maintains a real-time communication channel with the server and the other at least one remote computers, said communication channel uniquely associated with an element of the graph schema.

20. The system of claim 1 further comprising on the server, an output module that generates and stores a graph schema definition file and a mapping file.

\* \* \* \* \*